United States Patent
Beaufrere

(10) Patent No.: US 11,511,850 B2
(45) Date of Patent: *Nov. 29, 2022

(54) PROCESS AND MACHINE FOR REDUCING A DRAG COMPONENT OF A HORIZONTAL STABILIZER ON AN AIRCRAFT

(71) Applicant: The Boeing Company, Chicago, IL (US)

(72) Inventor: Henry Llewellyn Beaufrere, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 199 days.

This patent is subject to a terminal disclaimer.

(21) Appl. No.: 16/678,846

(22) Filed: Nov. 8, 2019

(65) Prior Publication Data

US 2020/0070952 A1    Mar. 5, 2020

Related U.S. Application Data

(62) Division of application No. 15/279,414, filed on Sep. 28, 2016, now Pat. No. 10,479,481.

(51) Int. Cl.
| | | |
|---|---|---|
| *B64C 19/00* | (2006.01) | |
| *B64C 13/16* | (2006.01) | |
| *B64C 5/10* | (2006.01) | |
| *B64C 9/00* | (2006.01) | |
| *B64C 5/02* | (2006.01) | |

(52) U.S. Cl.
CPC .............. *B64C 19/00* (2013.01); *B64C 13/16* (2013.01); *B64C 5/02* (2013.01); *B64C 5/10* (2013.01); *B64C 2009/005* (2013.01)

(58) Field of Classification Search
CPC ................................ B64C 19/00; B64C 13/16
See application file for complete search history.

(56) References Cited

U.S. PATENT DOCUMENTS

| | | |
|---|---|---|
| 4,479,620 A | 10/1984 | Rogers et al. |
| 4,536,843 A | 8/1985 | Lambregts |
| 4,566,657 A | 1/1986 | Grow |
| 4,705,236 A | 11/1987 | Rudolph |
| 5,008,825 A | 4/1991 | Nadkarni et al. |
| 6,079,672 A | 6/2000 | Lam et al. |
| 6,554,229 B1 | 4/2003 | Lam et al. |
| 7,367,530 B2 | 5/2008 | Harrigan et al. |
| 3,024,079 A1 | 9/2011 | Najmabadi et al. |
| 8,014,910 B2 * | 9/2011 | Mathieu ............... G05D 1/0083 244/46 |

(Continued)

OTHER PUBLICATIONS

Office Action, dated May 29, 2018, regarding U.S. Appl. No. 15/279,414, 15 pages.

(Continued)

*Primary Examiner* — Jessica B Wong
(74) *Attorney, Agent, or Firm* — Yee & Associates, P.C.

(57) ABSTRACT

A process and a machine for improving a performance of a particular model of an aircraft, via reducing a size of a horizontal stabilizer for the particular model of the aircraft, the process comprising augmenting a nose-up moment, for the particular aircraft model, provided by a reduced horizontal stabilizer for the particular aircraft model, via addition of an ailevatoron mixer.

20 Claims, 9 Drawing Sheets

(56) References Cited

U.S. PATENT DOCUMENTS

| | | | |
|---|---|---|---|
| 8,565,942 B2* | 10/2013 | Sauvinet | G05D 1/0083 701/4 |
| 8,712,606 B2 | 4/2014 | Beaufrere | |
| 8,738,199 B2* | 5/2014 | Sauvinet | G05D 1/0083 701/4 |
| 8,814,102 B2 | 8/2014 | Sauvinet | |
| 9,415,860 B2 | 8/2016 | Beaufrere | |
| 9,845,146 B2 | 12/2017 | Beaufrere | |
| 10,479,481 B2* | 11/2019 | Beaufrere | B64C 5/10 |
| 2002/0022909 A1 | 2/2002 | Karem | |
| 2003/0205644 A1 | 11/2003 | Najmabadi et al. | |
| 2009/0266942 A1 | 10/2009 | Karem | |
| 2011/0042526 A1 | 2/2011 | Sauvinet | |
| 2016/0004255 A1 | 1/2016 | Moxon | |
| 2016/0046375 A1 | 2/2016 | McNair | |
| 2017/0008625 A1 | 1/2017 | Olm | |
| 2017/0158309 A1 | 6/2017 | McDonnell | |
| 2018/0086430 A1 | 3/2018 | Beaufrere | |
| 2018/0086431 A1 | 3/2018 | Beaufrere | |

OTHER PUBLICATIONS

Final Office Action, dated Aug. 13, 2018, regarding U.S. Appl. No. 15/279,414, 8 pages.
Office Action, dated Nov. 6, 2018, regarding U.S. Appl. No. 15/331,717, 20 pages.
Office Action, dated Dec. 10, 2018, regarding U.S. Appl. No. 15/279,414, 8 pages.
Final Office Action, dated Jan. 29, 2019, regarding U.S. Appl. No. 15/331,717, 10 pages.
Final Office Action, dated Feb. 26, 2019, regarding U.S. Appl. No. 15/279,414, 12 pages.
Office Action, dated May 21, 2019, regarding U.S. Appl. No. 15/331,717, 13 pages.
Notice of Allowance, dated Jun. 21, 2019, regarding U.S. Appl. No. 15/279,414, 14 pages.
Notice of Allowance, dated Sep. 11, 2019 regarding U.S. Appl. No. 15/331,717, 7 pages.
Notice of Allowance, dated Oct. 9, 2019, regarding U.S. Appl. No. 15/331,717, 6 pages.
Loputaife, "Design of Deep Stall Protection for the C-17A," McDonnell Douglas Aerospace, Journal of Guidance, Control, and Dynamics, vol. 20, No. 4, Jul.-Aug. 1997, 8 pages.
"Airbus A320 Side Stick and Fly By Wire—An Update," S.G. Corps, Airbus Industrie, SAE Technical Paper Series 861801, Aerospace Technology Conference and Exposition Long Beach, California Oct. 13-16, 1986, 16 pages.
Tekles et al., "Flight Envelope Protection for NASA's Transport Class Model," AIAA Guidance, Navigation, and Control Conference, Jan. 13-17, 2014, National Harbor, Maryland, 47 pages.

* cited by examiner

PROCESS AND MACHINE FOR REDUCING A DRAG COMPONENT OF A HORIZONTAL STABILIZER ON AN AIRCRAFT

CROSS-REFERENCE TO RELATED APPLICATION

This application is a divisional of U.S. patent application Ser. No. 15/279,414, entitled "Process and Machine for Reducing a Drag Component of a Horizontal Stabilizer on an Aircraft", filed on Sep. 28, 2016 and issued U.S. Pat. No. 10,479,481 on Nov. 19, 2019; the entire contents of which are to be considered fully incorporated herein.

BACKGROUND INFORMATION

1. Field

The present disclosure relates generally to aircraft and, in particular, to controlling movement of the aircraft. Still more particularly, the present disclosure relates to reducing a drag component of a horizontal stabilizer of an aircraft via a process and machine for producing a pitch moment for an aircraft.

2. Background

Aircraft designers and operators face a constant challenge to create a process, machine, manufacture, and/or composition of matter that produce a technical effect that will reduce a cost and/or improve a performance, of an aircraft. Without limitation, reference to the aircraft may indicate not only the aircraft as a whole, but may also indicate a particular part and/or parts of the aircraft. Without limitation, reducing a cost can include reducing a cost to manufacture, maintain, and/or operate the aircraft. Without limitation, improving the performance of the aircraft can include an improvement in responsiveness, efficiency, and/or an increase in reliability for the aircraft. Without limitation, improving the efficiency of the aircraft may include reducing a weight and/or a drag of the aircraft, and/or improving a fuel efficiency of the aircraft. Thus, improving a process, machine, manufacture, and/or composition of matter for producing a pitch moment for an aircraft provides the technical effect of improving responsiveness, efficiency, and/or reliability for the aircraft.

While various structures of an aircraft generate aerodynamic forces that affect pitch control of the aircraft, most commonly, fixed wing aircraft control a nose-up or a nose-down pitch moment by generating an aerodynamic force on a horizontal stabilizer mounted at a tail of the aircraft. When the aircraft is in flight the pitch moments are evaluated as acting about a center of gravity of the aircraft. Pitch moments are also typically evaluated about a center of gravity for the aircraft when the aircraft is on the ground. However, to illustrate their effect on aircraft takeoff rotation, when the aircraft has the wheels of its main gear supporting the aircraft on a surface, the pitch moment may be evaluated as acting about an axis where the main gear of the aircraft contact the surface.

For a tricycle wheeled aircraft to stand or roll on a surface without suffering a tail portion of the aircraft dropping toward the surface, at least far enough to lift a nosewheel of the aircraft off of the surface, the center of gravity of the aircraft must be located forward (toward the aircraft nose) of the axis where the main gear of the aircraft contact the surface. Without limitation, the surface may be a runway, taxiway, and/or a ramp area.

For a tricycle wheeled aircraft to rotate its nosewheel up off the surface at takeoff (commonly referred to as rotation), the aircraft must be able to provide a moment, about the axis where the aircraft's main gear contact the runway, that is sufficient to lift the nosewheel of the aircraft up off the runway (referred to herein as a rotation moment), to a specified distance that sets a specified takeoff attitude for the aircraft relative to the runway and provides a specified takeoff pitch and/or takeoff angle of attack in the relative wind for the wings of the aircraft. Traditionally, the rotation moment that lifts the aircraft nosewheel off the runway has been provided by an aerodynamic force generated by a horizontal stabilizer at the tail of the aircraft.

Regulations, from various agencies around the globe, for certification of aircraft, particularly for aircraft used for commercial transport, require that the aircraft design must be able to lift the nose of the aircraft up to a position that results in liftoff from the runway at a specified airspeed, called rotation speed, also represented as $V_r$. A non-limiting example of such regulations in the United States may be found in the Federal Aviation Regulations (FARs), such as without limitation, FAR Part 25, and Federal Aviation Administration Advisory Circulars issued thereto. In particular, without limitation, requirements driven by 14 CFR §§ 25.101-115 may control rotation speed and other performance requirements that may affect without limitation, at least a size, a shape, and a location of a flight control surface on an aircraft, and systems that control and/or actuate the flight control surface on the aircraft.

More specifically, traditionally nearly all the rotation moment is generated by a horizontal stabilizer of the aircraft via producing an aerodynamic force from the horizontal stabilizer. There is a particular set of circumstances where the rotation moment required will be at a maximum value. As a non-limiting example, for a given rotation speed, when a center of gravity of the aircraft is located at its forward most allowed point, and the aircraft weight is at a maximum allowed value for takeoff, the rotation moment required that is sufficient to lift the nosewheel of the aircraft up off the runway to a specified distance that sets a specified takeoff attitude for the aircraft, may be at a maximum value. It is understood by one of skill in the art that the given rotation speed may be affected at least by, without limitation, a configuration of the aircraft, a thrust of the aircraft, rolling friction, and atmospheric conditions such as without limitation, altitude and temperature.

Moreover, for any particular aircraft model, some combination of: allowable forward (toward the nose of the aircraft from the axis where the main gear contact the runway) center of gravity, aircraft gross weight, and designated rotation speed will result in a value of rotation moment that must be generated to lift the nose of the aircraft up to a position that results in a takeoff attitude for the aircraft that at the designated rotation speed results in a liftoff of the aircraft from the runway, that is at a maximum value for the particular model aircraft.

Factors that determine the aerodynamic force that the horizontal stabilizer can produce to generate the rotation moment include an airspeed of the aircraft, a size of the horizontal stabilizer, a shape of the horizontal stabilizer, and an angle of attack of the horizontal stabilizer (in the relative wind impacting a leading edge of the horizontal stabilizer). Generally, when the nose gear and the main gear are in contact with the surface the aircraft is taking off from, the angle of attack of the horizontal stabilizer is set by a stabilizer trim position. Changes in the shape of the horizontal stabilizer (in operation, not in design phase) are generally limited to a deflection of a moveable flight control panel located in the horizontal stabilizer, known as an elevator.

In flight, for a horizontal stabilizer, of a particular airfoil shape set at a particular trim position and at a particular angle of attack to the relative wind meeting the horizontal stabilizer, increasing the airspeed will increase an aerodynamic force produced by the horizontal stabilizer, and thus increase a moment the horizontal stabilizer can produce, commonly measured about the center of gravity of the aircraft.

Thus, for a horizontal stabilizer of a particular shape at a given trim position using an elevator deflection that produces a maximum aerodynamic force that the horizontal stabilizer is capable of producing at the rotation speed, the maximum value of aircraft nose-up moment that the horizontal stabilizer can generate is proportional to the size of the horizontal stabilizer. Hence, for an aircraft where the moment required for rotation is provided principally by an aircraft nose-up pitch moment generated by the aerodynamic force generated by the horizontal stabilizer, as is the case for nearly all existing fixed wing tricycle gear configured aircraft, and particularly so for existing commercial transport aircraft, a limit to the smallest size currently allowable for a horizontal stabilizer may be set by a required maximum rotation moment at a set rotation speed for a combination of a particular takeoff weight for the aircraft with a particular forward location of the center of gravity of the aircraft.

Additionally, as one of ordinary skill in the art appreciates, increasing a size of the horizontal stabilizer increases the profile drag produced by the horizontal stabilizer. Further, for a given sized horizontal stabilizer, profile drag produced by the horizontal stabilizer increases as airspeed of the aircraft is increased. Thus, for any given sized horizontal stabilizer, the profile drag produced by the horizontal stabilizer will increase as the aircraft airspeed increases.

Once the aircraft is off the runway, all moments that raise or lower an aircraft nose relative to the horizon, or pitch moments, are normally calculated as acting, not about any point on the main gear, but instead, about the center of gravity of the aircraft. At a given airspeed and with the horizontal stabilizer fixed at a given distance from the center of gravity, either a larger angle, relative to a relative wind at the horizontal stabilizer, a greater camber of the horizontal stabilizer, or a larger size of the horizontal stabilizer is generally needed to increase the moment generated about the horizontal stabilizer. Increasing an effective camber of the horizontal stabilizer may be caused by an increased deflection of the elevator on the horizontal stabilizer. In particular, during takeoff roll for an aircraft, a size, a shape, and an angle of attack for a given horizontal stabilizer determine how much pitch change (rotation) the aircraft can achieve at any given airspeed.

Traditionally, and particularly so for commercial transport aircraft, once off the runway, pitch moments approaching a magnitude required for the rotation moment are not required. Even if such a magnitude was required in flight, at least because the airspeed of the aircraft in flight is greater than rotation speed, such moments could be provided by a much smaller sized horizontal stabilizer than is needed at rotation speed.

As the airspeed of the aircraft increases above rotation speed, the size needed for the horizontal stabilizer to produce a particular value of aerodynamic force decreases, because a force produced by a particular size horizontal stabilizer at a given angle of attack increases with increased speed. Hence, at speeds higher than rotation speed, a horizontal stabilizer of a fixed size is able to generate greater aerodynamic forces and thus greater moments about a center of gravity of the aircraft than the horizontal stabilizer was capable of at rotation speed. Thus, for aircraft designs that lack the technical benefits of the embodiments described herein, after rotation at takeoff, the aircraft pays drag penalties because the horizontal stabilizer is oversized for all the remaining performance requirements for the flight of the aircraft.

Thus, if the full size of a particular horizontal stabilizer is not needed to produce the magnitudes of moments needed for aircraft performance requirements throughout the rest of the flight after rotation, using a particular size horizontal stabilizer to generate the aerodynamic force that generates the required rotation moment at a set rotation speed, results in flying the entire remainder of the flight after rotation with a horizontal stabilizer that is much larger than needed to produce the aerodynamic forces that will be required from the particular horizontal stabilizer for the rest of the flight. In other words, without incorporating an embodiment of a novel machine and/or process described herein, an aircraft, after rotation, may carry a drag load from a horizontal stabilizer that is larger than would be required for those aircraft by an embodiment of the novel machine and/or process described herein.

Accordingly, this oversized (traditionally sized) horizontal stabilizer, creates the technical deficiency of producing drag penalties that negatively impact the aircraft performance and fuel economy of the aircraft up until, and then after, rotation. Further, these drag penalties from the traditional horizontal stabilizer are not offset by any improvements to performance of the aircraft for the expected flight envelope for the aircraft after rotation.

The oversized horizontal stabilizer also weighs more than a novel horizontal stabilizer of a reduced size would. Increased weight of an aircraft tends to increase the aircraft's fuel consumption. Hence, for aircraft with a traditional horizontal stabilizer, drag, aircraft weight, and resulting fuel economy for the aircraft all exist in technical deficiency as compared to an aircraft that might be able to produce the required maximum rotation moment with a horizontal stabilizer that is smaller than the traditional horizontal stabilizer (referred to hereinafter as a reduced horizontal stabilizer). In other words, large numbers of aircraft flying today, after rotation, carry an excessive amount of unproductive weight from a horizontal stabilizer that is heavier than would be required for those aircraft by embodiments of the novel machine and process described herein. In other words, without incorporating an embodiment of a novel machine and/or process described herein, an aircraft, after rotation, may an excessive amount of unproductive weight from a horizontal stabilizer that is larger than would be required for those aircraft by an embodiment of the novel machine and/or process described herein.

Therefore, it would be desirable to have a process and machine that take into account at least some of the issues discussed above, as well as other possible issues. For example, it would be desirable to have a process and machine that overcome the technical deficiencies resulting from a current size requirement for a horizontal stabilizer determined by current technologies for generating a rotation moment for an aircraft during takeoff.

SUMMARY

Embodiments herein describe at least a process for reducing a size of a horizontal stabilizer for a particular aircraft model, the process including augmenting a nose-up moment, for the aircraft, provided by a horizontal stabilizer of a reduced size for the particular aircraft model. Another embodiment includes a process for improving the fuel efficiency for a given aircraft via reducing a size of a horizontal stabilizer for a particular aircraft model. Another embodiment includes a machine configured to reduce a size of a horizontal stabilizer for a particular aircraft model while sustaining a nose-up moment, required for takeoff, for an aircraft of a particular model loaded at maximum gross takeoff weight with a center of gravity located at a maximum forward location allowed, such that the machine comprises an aileron control system configured to symmetrically deflect ailevatorons, located aft of an axis of contact of a main gear of the aircraft, away from a runway.

Additional embodiments may show a process for supplementing a pitch moment generated by a given horizontal stabilizer for a given aircraft. Further embodiments may provide a process of reducing a takeoff/rotation airspeed for an aircraft via a machine for supplementing a pitch moment produced by a given horizontal stabilizer for a given aircraft.

BRIEF DESCRIPTION OF THE DRAWINGS

Features believed novel and/or characteristic of the illustrative embodiments are recited in the appended claims. Understanding of the illustrative embodiments, as well as a preferred mode of use, further objectives and features thereof, will be enhanced by reference to the following detailed description of illustrative embodiments of the present disclosure when read in conjunction with the accompanying drawings, wherein:

DETAILED DESCRIPTION

Figure 1:
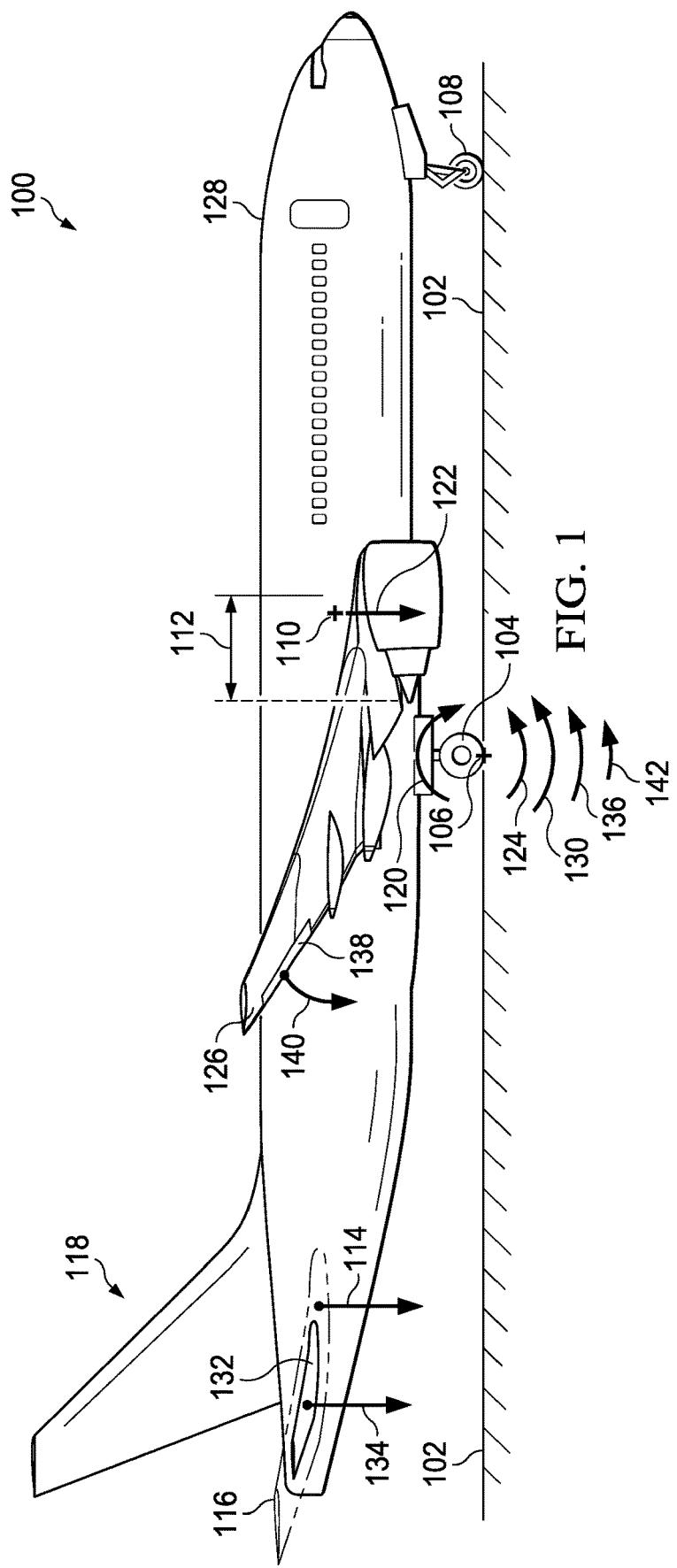
FIG. 1 is an illustration a side-view of an aircraft with a nosewheel and main gear in contact with a surface in accordance with an illustrative embodiment.

The illustrative embodiments recognize and take into account one or more different considerations. Aircraft components may produce lift and drag. For example, the illustrative embodiments recognize and take into account that reducing a value of aerodynamic drag (drag for short) for any component of an aircraft may increase the fuel efficiency of the aircraft. Lift producing components may produce an induced drag due to lift production and a profile drag due to the profile (also known as a shape, a size, or a form of the component). Generally the amount of profile drag a component produces increases as the airspeed of the aircraft increases. Therefore, to lower profile drag contributed by a component of the aircraft it may be desirable to reduce a size of a component, such as without limitation a horizontal stabilizer of the aircraft.

Reducing a size of an aircraft component may also reduce a weight of the component and thus reduce a weight of the aircraft. Reducing the weight of the aircraft may increase the fuel efficiency of the aircraft. Thus, it may be desirable, for any given aircraft to reduce a size and weight of the horizontal stabilizer for that aircraft, and thereby reduce the drag and increase fuel efficiency of the aircraft.

The illustrative embodiments recognize and take into account that reducing the size of the horizontal stabilizer for a particular aircraft model may reduce an ability of the horizontal stabilizer to produce pitch moments about center of gravity and reduce an ability of the horizontal stabilizer to generate a rotation moment about an axis where the main gear contact takeoff surface.

Thus, in order to produce a maximum rotation moment required for rotation and takeoff for a particular aircraft model, a process and/or machine may be needed to supplement the rotation moment produced by a horizontal stabilizer (referred to hereinafter as stab moment—for a traditionally sized horizontal stabilizer) of a reduced size (referred to hereinafter as reduced moment produced by a reduced horizontal stabilizer) for the particular aircraft model. As used herein, a particular aircraft model may refer to a particular aircraft type, such as without limitation a B777, or to a particular series of a type aircraft, such as without limitation B777-300, or to a generation of an aircraft design, such as without limitation, the B737 MAX.

The illustrative embodiments recognize and take into account that despite the ability of the horizontal stabilizer of any given shape to increase pitch moments produced by the horizontal stabilizer as an airspeed of the aircraft increases, the maximum pitch moment requirement that a traditional horizontal stabilizer must produce throughout its entire flight envelope is often the rotation moment needed at takeoff. Thus, at least as explained above, a size and/or shape (also known as form or profile) as well as the weight of the traditional horizontal stabilizer create technical inefficiencies at least of increased drag and fuel consumption of the aircraft throughout the rest of the flight after takeoff.

The illustrative embodiments also recognize and take into considerations, that sizing requirements for a horizontal stabilizer may be impacted at least by: a range allowed for a location for a center of gravity of the aircraft, and by requirements to control aircraft nose-down pitch in flight. The requirements may be driven by an airspeed near or at stall identification, such as without limitation, United States Federal Aviation Regulations presented in 14 CFR § 25.145 and/or 14 CFR § 25.201 and 25.103. Further, in aircraft where ailerons remain effective in stall conditions, such as, without limitation, via a leading edge auto-slat deployment system, and/or a location and/or sizing of an aileron and/or ailevatoron, a stall recovery system may be applied that would reduce a size requirement of a horizontal stabilizer that is driven by nose-down pitch authority requirements.

Additionally, the illustrative embodiments recognize and take into account that fly-by wire control systems using buses, such as those used in computers, are becoming more common in aircraft. For example, special flight control programs in a computer processor may send commands to special actuator control programs in processors that control devices in the aircraft. Actuator control programs may control, for example, a flight control surface, an engine, or some other suitable device in the aircraft that may affect a change in pitch attitude or rate of an aircraft.

The illustrative embodiments recognize and take into account that a bus may be a parallel bus or a serial bus. When a parallel bus is used, units of data, such as a word, may be carried on multiple paths in the bus.

Moreover, the illustrative embodiments provide a method and apparatus for controlling flight control surfaces on an aircraft. Such methods and apparatus may include a data bus system, and actuator control programs and/or flight control programs specially programmed in processors. A data bus system may be located in an aircraft. The actuator control programs may be in communication with the data bus system.

An actuator control program may control positioning of a group of flight control surfaces on the aircraft using commands on the data bus system that are directed to the actuator control program. Control of flight control actuators may be commanded by a flight control system that may contain flight control programs that may be connected to the data bus system.

The flight control programs generate and send the commands onto the bus system to control the flight control surfaces on the aircraft. The commands for a flight control surface are directed towards a group of actuator control programs on processors assigned to the actuators of the flight control surfaces.

A "group of," as used herein with reference to items, means one or more items. For example, a "group of actuator control modules" is one or more actuator control modules.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

With reference now to the figures, and in particular, with reference to FIG. 1, an illustration of a side-view of an aircraft with a nosewheel and main gear in contact with a surface is depicted in accordance with an illustrative embodiment. In this illustrative example, aircraft 100 is shown standing on surface 102 with the wheels of (right side shown) main gear 104 contacting surface 102 at axis 106 while nosewheel 108 is also in contact with surface 102. Axis 106 is formed by a line between the contact point of a left side main gear (aligned and hidden behind right side main gear shown) and the contact point of the right main gear 104 with surface 102. Without limitation, surface 102 may be a takeoff surface, a runway, a taxiway, or a parking apron or other ramp area.

Center of gravity 110 is shown located within range 112 of allowable locations for center of gravity 110 for aircraft 100. Range 112 of locations allowable for center of gravity 110 for aircraft 100 may be determined by performance considerations for aircraft 100 and regulations. Regulations may include without limitation United States Federal Aviation Regulations Part 25.

Aerodynamic force 114 is generated by (traditionally sized) horizontalstabilizer 116 located at tail 118 of aircraft 100. Aerodynamic force 114 generated by (traditionally sized) horizontal stabilizer 116 may be a representation of a summation of a lift force and a drag force produced by (traditionally sized) horizontal stabilizer 116.

For aircraft 100 as shown in FIG. 1, moment 120, also called weight moment 120, acts to hold nosewheel 108 on surface 102 by acting about axis 106, caused by weight 122 acting through center of gravity 110. During initial takeoff roll for aircraft 100, weight moment 120 is greater than stab moment 124 acting about axis 106, caused by aerodynamic force 114 on (traditionally sized) horizontal stabilizer 116. Hence, with weight moment 120 greater than stab moment 124, nosewheel 108 remains on surface 102 as aircraft 100 stands or rolls along surface 102.

At rotation speed, rotation moment 130 must be generated that will lift nosewheel 108 above surface 102 and place aircraft 100 in a takeoff attitude. For any particular aircraft model, at rotation speed, aerodynamic forces generated by other (non-horizontal stabilizer) components of the aircraft, such as without limitation wing 126, main gear 104, a fuselage, and/or thrust, may contribute to moments about axis 106. Wing 126 shown is a wing on a right side of aircraft 100, however wing 126 and components thereon, discussed below in further detail, may be considered as representative for a left wing on aircraft 100 as well.

Forces generated by non-horizontal stabilizer components of aircraft 100 may affect rotation of aircraft 100 and rotation moment 130. Without limitation, such forces may include at least thrust and lift. For clarity of emphasis on the technical effects of the machine and/or process embodiments described herein, forces generated by other non-horizontal stabilizer components of aircraft 100 not specifically detailed within the descriptions below are incorporated into rotation moment 130 described herein, and thus are not specified in detail in the present review of the illustrative embodiments, or included in FIG. 1, with the exception of forces and moments generated and/or affected by the novel embodiment(s) introduced herein.

Thus, as described above, if (traditionally sized) horizontal stabilizer 116 has its size reduced to form reduced horizontal stabilizer 132 then aerodynamic force 114 will be replaced by aerodynamic force 134, which is smaller than aerodynamic force 114. As a result, stab moment 124 will be replaced by reduced moment 136. Reduced moment 136 will have a lower magnitude than stab moment 124, and thus will need a supplementary moment added to produce the equivalent magnitude required to equal the magnitude of rotation moment 130.

When aircraft 100 has wing 126 in a configuration, such as without limitation a swept configuration, where ailevatoron 138 on wing 126 is located aft of axis 106, then when ailevatoron 138 produces force 140 that acts downward toward surface 102 and aft (toward tail 118 from axis 106)

of axis 106, ailevatoron 138 generates ailevatoron moment 142. Ailevatoron 138 is an aerodynamic surface on a wing that may replace and/or supplement a traditional aileron. An existing aileron on wing 126 may be commanded to a use that may re-designate the aileron as ailevatoron 138. Ailevatoron moment 142 is shown in a nose-up direction for symmetric deflection(s) of ailevatoron(s) 138 that acts to supplement reduced moment 136 up to a magnitude of rotation moment 130.

Conventionally, each of the moments shown in FIG. 1, may be analyzed as a moment about center of gravity 110 due to the same forces shown and discussed for FIG. 1, but with a different moment arm. Thus, any moment represented in FIG. 1 may have a comparable moment that is calculated about center of gravity 110 instead of the rotation point of axis 106. Accordingly, although responsive to the same forces, moments calculated about center of gravity 110 would have a different magnitude, due to the reference point shift and moment arm difference, from moments calculated about axis 106 caused by the same forces.

Ailevatoron 138, may have a same shape, material, strength, range of motion, size, and be located in a same place on an aircraft as an aileron located on a particular aircraft model before replacing horizontal stabilizer 116 with reduced horizontal stabilizer 132. In an embodiment, ailevatoron 138 may replace an aileron of the particular model with a flight control surface that has a different shape, material, strength, and/or size than the aileron. In an embodiment, a location of ailevatoron 138 may be moved to a different location on wing 126 than location of the aileron of the particular model before replacing horizontal stabilizer 116 with reduced horizontal stabilizer 132. Ailevatoron 138 may be moved further aft, towards aircraft tail, from axis 106, via moving ailevatoron 138 further outboard on a swept wing 126, than the location for the aileron originally on the particular model before replacing horizontal stabilizer 116 with reduced horizontal stabilizer 132.

Deflection of a trailing edge of ailevatoron 138 may be activated by same actuator as aileron actuator originally on the particular model before replacing horizontal stabilizer 116 with reduced horizontal stabilizer 132. In an embodiment, actuator for ailevatoron 138 may be changed from aileron actuator to an ailevatoron actuator. The ailevatoron actuator may provide the technical effect of making a rate of movement of ailevatoron 138 faster and/or more precisely controlled than a rate of movement previously capable for the aileron originally on the particular model before replacing horizontal stabilizer 116 with reduced horizontal stabilizer 132.

Ailevatoron 138 may be commanded to displace from a position flush with a trailing edge of wing 126 and thereby generate force 140 that generates ailevatoron moment 142. Force 140 may be an aerodynamic force resultant from a drag and a lift caused by wing 126. Ailevatoron moment 142 can be generated with a magnitude sufficient to supplement reduced moment 136 up to equal rotation moment 130 required for takeoff.

Each wing 126 will include at least one ailevatoron 138 located along a trailing edge of each wing 126. Wing 126 trailing edge is the edge of wing 126 closest to tail 118.

Generally, ailevatoron moment 142 is generated by a rotation of a trailing edge of ailevatoron 138 upward (TEU) and away from surface 102. The trailing edge is the edge closest to tail 118 of aircraft 100. Usually, the trailing edge of ailevatoron 138 on each left wing 126 will deflect upward symmetrically and in equal magnitude with deflection of the trailing edge of ailevatoron 138 on right wing 126.

However, in an embodiment, if roll commands are being input at the time ailevatoron 138 trailing edge upward deflection is scheduled, it is possible that deflection of the trailing edge of ailevatoron 138 on left wing 126 may deflect upward asymmetrically relative to deflection of the trailing edge of ailevatoron 138 on right wing 126 if such asymmetry is needed to supplement roll control of aircraft 100. Hereinafter, any reference to a deflection of ailevatoron 138 will indicate deflection of the trailing edge of ailevatoron 138.

Figure 2:
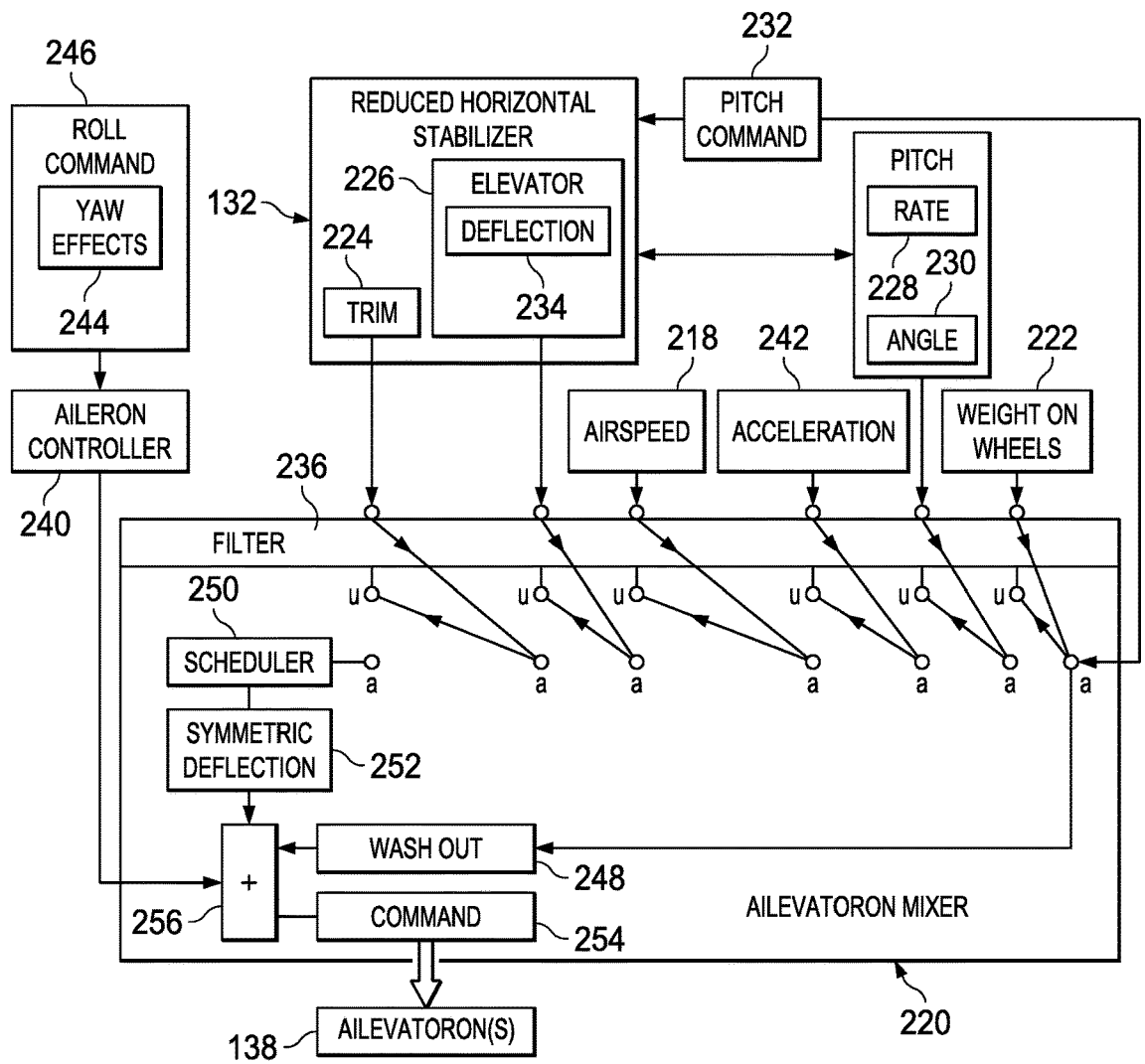
FIG. 2 is an illustration of a schematic representation of relative magnitudes of rotation moment control for an aircraft, and components contributing thereto, in accordance with an illustrative embodiment.
Figure 2:
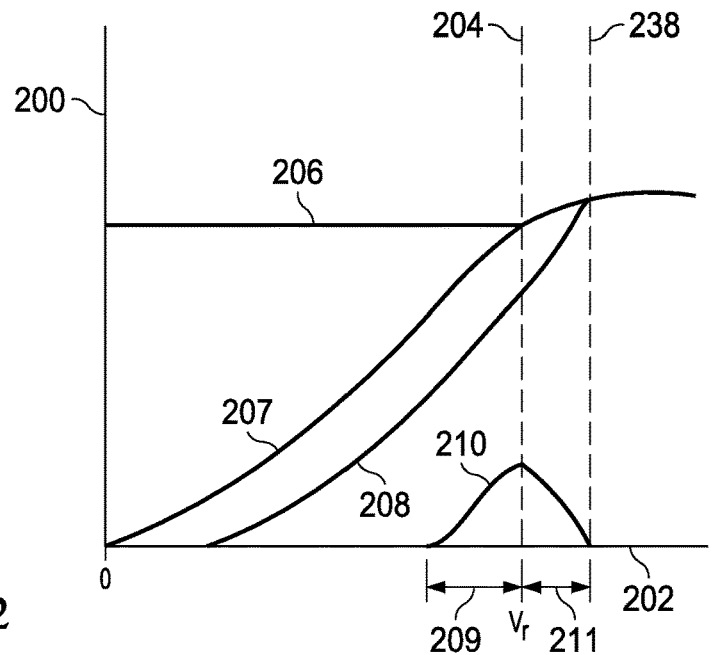

In an embodiment, an ailevatoron mixer, as shown without limitation, as ailevatoron mixer 220 in FIG. 2, may act in series between an aileron mixer and an aileron/ailevatoron actuator with an activation, triggered by a weight-on-wheels condition, that adds commands, for degree of symmetric ailevatoron 138 deflections that create ailevatoron moment 142, onto existing roll commands to ailevatoron 138 from an aileron mixer. In an alternate embodiment, ailevatoron mixer 220 outputs may be received into an aileron mixer and added in the aileron mixer and sent to the aileron/ailevatoron actuator.

The summing effect of roll commands and pitch commands through ailevatoron mixer 220 may result in an asymmetric defection of ailevatoron 138 on wing 126 on a left side of aircraft 100 relative to wing 126 on a right side of aircraft 100. Thus, as a non-limiting example, and as will be described in further detail later, if as rotation velocity occurs, a roll command to an aileron mixer exists that has ailevatoron 138 on wing 126 on left side of aircraft 100 deflected downward ten degrees, and ailevatoron 138 on wing 126 on right side of aircraft 100 at a ten degree upward deflection, then when a pitch command to rotate the aircraft is received at rotation velocity, the ailevatoron mixer 220 will add, as a non-limiting example, 10 degrees upward deflection to ailevatoron 138 on each wing. Thus, at rotation and lift-off for aircraft 100, ailevatoron 138 on left wing of aircraft 100 would be zero degrees and ailevatoron 138 on right wing of aircraft 100 would be deflected up 20 degrees.

In an alternate embodiment, an aileron mixer may be replaced by ailevatoron mixer 220. In such an embodiment, ailevatoron mixer 220 receives all roll commands as well as pitch rotation commands, and sums the commands for symmetric deployment of ailevatoron 138 to generate ailevatoron moment 142 with roll commands to determine ultimate commands for deflection sent to actuators for ailevatoron 138 on each wing. Thus, as a non-limiting example, and as will be described in further detail later, if as rotation velocity occurs, a roll command to ailevatoron mixer 220 exists that has ailevatoron 138 on wing 126 on left side of aircraft 100 deflected downward one degree, and ailevatoron 138 on wing 126 on right side of aircraft 100 deflected trailing edge upward one degree, then when a pitch command to rotate the aircraft is received in ailevatoron mixer 220 at rotation velocity, the ailevatoron mixer 220 will add, as a non-limiting example, ten degrees upward deflection to ailevatoron 138 on each wing. Thus, at rotation and lift-off for aircraft 100, ailevatoron 138 on left wing of aircraft 100 would be deflected trailing edge upward 9 degrees and ailevatoron 138 on right wing of aircraft 100 would be deflected trailing edge upward 11 degrees.

Aircraft nose-up rotation at rotation speed is commanded with a nose-up pitch command that initially directs deflection of an elevator on reduced horizontal stabilizer 132. To maintain consistency in command response between operation of a particular aircraft model with horizontal stabilizer 116 and reduced horizontal stabilizer 132, generation of ailevatoron moment 142 may be programmed such that nose-up pitch response of aircraft 100 remains the same for similar command inputs regardless of whether horizontal stabilizer 116 or reduced horizontal stabilizer 132 were mounted on aircraft 100. Thus, to an operator, the technical effect of ailevatoron 138 will not change required command inputs or pitch response of aircraft 100 to command inputs.

In other words, the response and feel of aircraft 100 at rotation would be seamless, or without difference to an operator of aircraft 100. Hence, generation of ailevatoron moment 142 that supplements reduced moment 136 keeps rotation moment 130 generated equivalent between aircraft mounted with horizontal stabilizer 116 and reduced horizontal stabilizer 132, and thereby provides the enhanced technical effect of increased aircraft performance and fuel efficiency without requiring any additional inputs or training for an operator of aircraft 100.

Thus, a novel machine referred to as an ailevatoron mixer is designed to produce the technical effect of commanding ailevatoron 138 to produce force 140 required to supplement reduced moment 136 produced by reduced horizontal stabilizer 132 such that rotation moment 130 produced by aircraft 100 with reduced horizontal stabilizer 132 may be equivalent in rate of application and magnitude to rotation moment 130 produced by aircraft 100 with horizontal stabilizer 116.

With reference to FIG. 2, an illustration of a schematic representation of relative magnitudes of rotation moment control for an aircraft, and components contributing thereto, is depicted in accordance with an illustrative embodiment. In this illustrative example, vertical axis 200 represents magnitude (increasing upward along vertical axis 200) of nose-up pitch moments acting on aircraft 100. Conventionally, magnitudes for the moments may be calculated as acting about center of gravity 110 of FIG. 1. Horizontal axis 202 represents a magnitude (increasing to the right along horizontal axis 202) of an aircraft airspeed, with rotation speed (also referred to as $V_r$) marked by $V_R$ line 204.

Level 206 represents a magnitude of rotation moment 130 about axis 106, in aircraft 100 nose-up direction, required for aircraft 100 rotation at takeoff and initial climb of aircraft 100 away from surface 102. Segment 207 represents a magnitude of stab moment 124 produced by horizontal stabilizer 116 up to rotation speed, $V_r$, represented at $V_R$ line 204. Segment 208 represents a magnitude of reduced moment 136 produced by reduced horizontal stabilizer 132. Segment 210 represents ailevatoron moment 142 produced by ailevatoron(s) 138 deflection(s), just prior to rotation speed 204, symmetrically upward away from surface 102. Depending upon specific characteristics of aircraft 100, segment 207, segment 208, and segment 210 may be: curved, linear, linear with curved portions, or curved with linear portions, so long as at $V_R$ line 204, a magnitude of ailevatoron moment 142 represented by segment 210 plus a magnitude of reduced moment 136 represented by segment 208 equal the required magnitude of rotation moment 130 represented by level 206. Generally, a magnitude for ailevatoron moment 142 at rotation ($V_R$ line 204), will be in the range of 12-17% of the magnitude for reduced moment 136 if the moments are computed about axis 106. Concurrently, a magnitude for ailevatoron moment 142 at $V_R$ line 204, will be in the range of 14-20% of the magnitude for reduced moment 136 if the moments are computed about center of gravity 110.

The distance from the point where segment 210 intersects horizontal axis 202 to $V_R$ line 204 represents an amount of time, deflection period 209 of ailevatoron(s) 138, which is dependent on acceleration of aircraft 100. Similarly, the increase in velocity from $V_R$ to the velocity at the point where segment 214 intersects horizontal axis 202 represents an amount of time for a washout of the symmetric deflection of the ailevatoron(s) 138, washout period 211 for ailevatoron(s) 138.

In FIG. 2, deflection period 209 and washout period 211 may be shown expanded for ease of viewing, and may not be shown in scale to each other, or in scale to segment 207, segment 208, or segment 210. Likewise, relative magnitudes of segment 210 and 208 are not necessarily scaled to level 206 beyond representing the cumulative nature of the moments indicated by the two segments.

Deflection period 209 and washout period 211 may each be dependent upon specific characteristics of aircraft 100 and of environment for a given takeoff, such as without limitation, thrust, altitude, air temperature, configuration of aircraft 100, location of center of gravity 110 on aircraft 100, as well as other aerodynamic and environmental factors. In an embodiment, deflection period 209 and washout period 211 may be a different length from each other and may each be less than one second. In an embodiment, deflection period 209 and washout period 211 may be a different length from each other and may each be between two and 0.1 seconds.

As discussed above, as soon as main gear 104 lifts off surface 102, and aircraft 100 is flying, aircraft pitch no longer rotates about axis 106, but about center of gravity 110. In flight, to control a pitch attitude for aircraft 100, aerodynamic forces generated by wing 126 create moments that act about center of gravity 110, and become the principal forces that must be counteracted by aerodynamic force 134 from reduced horizontal stabilizer 132.

After $V_r$, to the right of $V_R$ line 204, segment 207 represents a magnitude, for a pitch moment acting about aircraft center of gravity 110 after aircraft 100 lifts off from surface 102, required to set an attitude of aircraft 100 at a desired pitch for initial climb away from surface 102. After $V_r$, to the right of $V_R$ line 204, segment 210 represents a magnitude of a nose-up moment, acting about center of gravity 110, that is generated by the ailevatoron 138 as the upward deflection of ailevatoron 138 is removed, or "washed out". After $V_r$, to the right of $V_R$ line 204, segment 208 represents a magnitude of a moment generated about center of gravity 110 by reduced horizontal stabilizer 132.

When airspeed increases to a magnitude represented by line 238, then segments 208 and 207 join each other. When airspeed of aircraft 100 increases above a magnitude represented by line 238, then reduced horizontal stabilizer 132 becomes able to produce force 134 at a magnitude great enough to provide reduced moment 136 at magnitudes required for aircraft 100 to continue climb up away from surface 102 without a supplement from ailevatoron moment 142 from ailevatoron 138.

Magnitudes, represented by segment 210, of moments produced by deflection of ailevatoron 138 upward (away from surface 102) are a function of airspeed 218 of aircraft 100 and an amount of degrees of deflection of ailevatoron 138. Deflection of ailevatoron 138 is commanded by novel ailevatoron mixer 220. As illustrated by the schematic on the top half of FIG. 2, ailevatoron mixer 220 commands a deflection for ailevatoron 138 based upon inputs to ailevatoron mixer 220 of at least airspeed 218 of aircraft 100, aircraft 100 status relative to surface 102, acceleration 242 of aircraft 100, yaw effects 244 and roll command 246, moments produced by reduced horizontal stabilizer 132 due to trim 224, and deflection 234 of elevator 226 on, reduced horizontal stabilizer 132, as well as feedback on pitch rate 228 and pitch angle 230, and moments produced by other aircraft components.

Aircraft 100 status relative to surface 102 may be provided to ailevatoron mixer 220 by weight-on-wheels signal 222. Ailevatoron mixer 220 contains filter 236, and will not pass pitch command 232 to ailevatoron 138 unless each input into filter 236 is at a desired level for the component input. As an example, ailevatoron mixer 220 will not command upward deflection of ailevatoron 138 when weight-on-wheels signal 222 tells ailevatoron mixer 220 that aircraft 100 main gear 104 are not on surface 102.

When ailevatoron mixer 220 receives a change in weight-on-wheels signal 222, from indicating aircraft 100 is on surface 102 to indicating that aircraft 100 is no longer on surface 102, ailevatoron mixer 222 commands ailevatoron 138 to "washout" 248 ailevatoron 138 symmetric deflection 252 upward, and respond to roll command 246 for aircraft 100 in the manner of an aileron, as mounted and controlled on aircraft 100 before replacing horizontal stabilizer 116 with reduced horizontal stabilizer 132. As shown by segment 214, washout 248 of symmetric upward deflection is an elimination, within a designated period of time, of any added symmetric deflection 252 upward applied to ailevatoron(s) 138.

Reduced moment 136 produced by reduced horizontal stabilizer 132 is a function of airspeed 218, acceleration 242, trim 224 of reduced horizontal stabilizer 132, and a deflection of elevator 226 on reduced horizontal stabilizer 132, as well as deflection 234 of elevator 226 of aircraft 100. Scheduler 250 may be located within confines of ailevatoron mixer 220 as shown, or within a flight control computer in communication with ailevatoron mixer 220.

Ailevatoron mixer 220 may be a part of and located within a flight control computer. Deflection of elevator 226 is determined by pitch command 232 sent to elevator 226. Pitch command 232 sent to elevator 226 is based upon desired rate 228 of a change in pitch angle 230 for aircraft 100 and a desired pitch angle 230 for aircraft 100 in addition to weight-on-wheels signal 222. Pitch command 232 is not processed through scheduler 250 to determine symmetric deflection 252 to be added to aileron controller 240 input to mixer 256 to form command 254 to deflect ailevatoron 138 unless each condition sent into filter 236 is within a designated acceptable value for that condition. Acceptable values designated for each condition may be determined via values received by filter 236 of other conditions.

FIG. 2 and filter 236 are not meant to depict a singular hardware configuration for the embodiment, but rather illustrate a logic and outcome of a configuration for filter 236 and ailevatoron mixer 220. In all cases, ailevatoron mixer 220 only passes pitch command 232, along with values for each condition input into filter 236, on to scheduler 250 when, each condition input is within an designated range. As depicted by FIG. 2, conditions input include at least trim 224, deflection 234 of elevator 226, airspeed 218 of aircraft 100, acceleration 242 of aircraft 100, pitch angle 230, pitch rate 228, and weight-on-wheels signal 222. As depicted by FIG. 2, when a given condition is within a designated range (acceptable), filter 236 releases a switch for the particular condition, from unacceptable position "u", that prevents values of the particular condition from reaching scheduler 250, down to position "a" below position "u", so that information of acceptable condition may be passed on to scheduler 250 when all conditions are within their respective designated range. As shown in FIG. 2, every switch for every condition is at unacceptable position "u".

Figure 3:
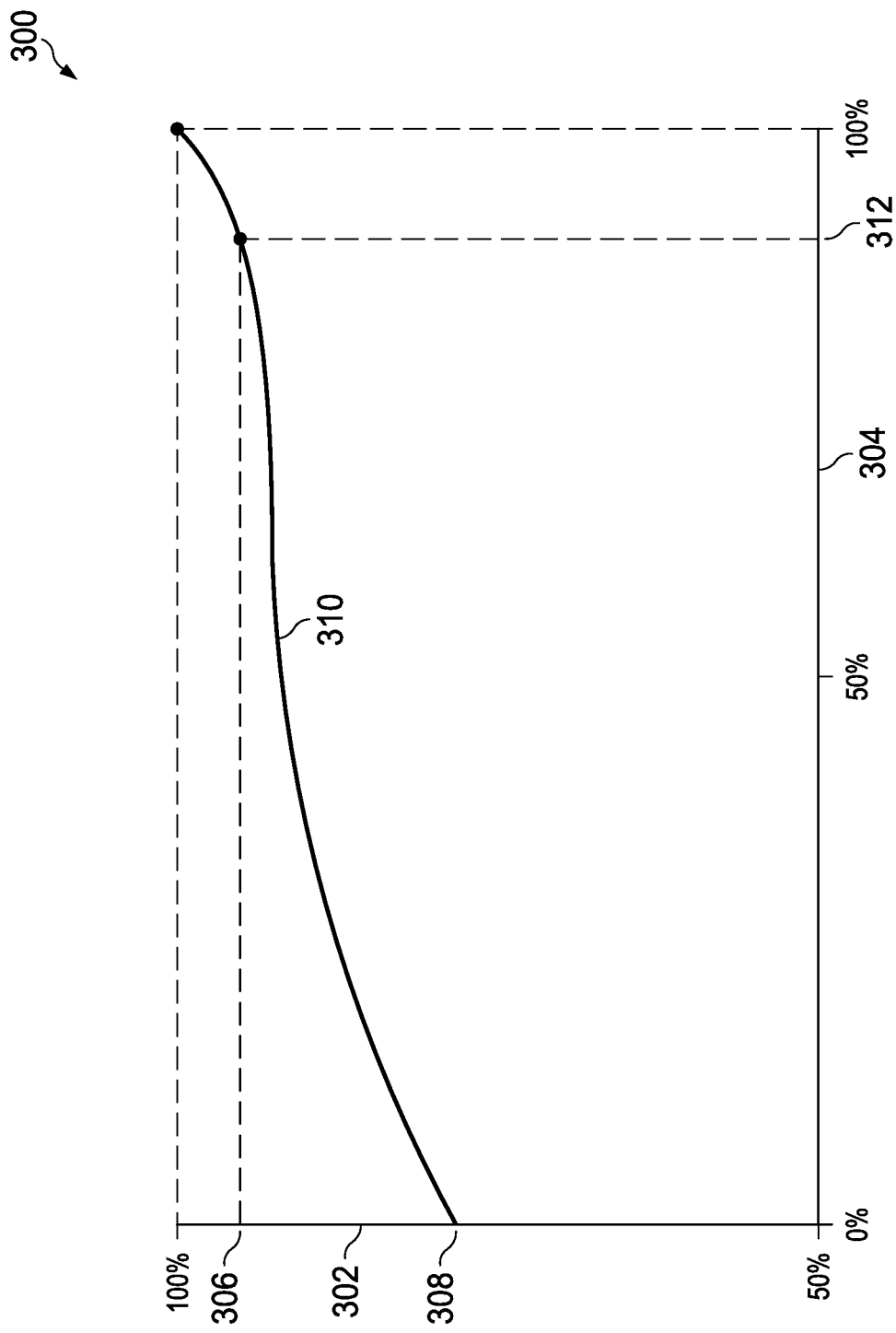
FIG. 3 presents a graph that represents the relative magnitude of an upward deflection of a trailing edge of an ailevatoron relative to a magnitude of a trailing edge of an elevator deflection in a direction that generates a nose-up pitch for an aircraft in accordance with an illustrative embodiment.

As a non-limiting example, if a command was given to immediately increase pitch of aircraft 100 to rotate and takeoff, and weight was on wheels, and aircraft 100 was accelerating properly, but airspeed was 20 knots below rotation speed, filter 236 would not allow the switch for airspeed to move from its "u" position to its "a" position, and thus scheduler 250 would not receive signals for each condition, and would not send symmetric deflection 252 value into mixer 256. As another non-limiting example, if all conditions were within designated ranges, then all switches would be in acceptable "a" positons and all signals would pass into scheduler 250 that determines magnitude of symmetric deflection 252 to send to mixer 256. Magnitude of symmetric deflection 252 determined by scheduler 250 based upon conditions of elevator deflection 234 is shown in FIG. 3. As a further non-limiting example, when weight-on-wheels signal 222 changes from a condition of aircraft 100 being on surface 102 to aircraft 100 not being on surface 102, washout 248 filter sends values into mixer 256 to washout any existing symmetric deflection 252 over a designated time to a value of zero. Without limitation, designated time may be in a range from 2.0-0.2 seconds.

Hence, activation of ailevatoron(s) 138 by ailevatoron mixer 220 is dynamic, and driven by dynamic symmetric deflection 252 determinations from scheduler 250 based upon conditions input to scheduler 250. Thus, as a non-limiting example, degrees of symmetric deflection may vary as airspeed 218 of aircraft 100 changes. Filter 236 also functions dynamically in real-time, such that acceptable ranges for any individual condition input may change dependent upon current value of other conditions input to filter 236. Filter 236 may be configured as program code stored in a processor.

As discussed further below, filter 236 and ailevatoron mixer 220 may be formed via hardware, a specially programed code in a processor, ACSI circuits, other equipment and methods described for FIG. 4, and/or combinations thereof. In an embodiment, filter 236 may be within a flight control computer in communication with ailevatoron mixer 220. In an embodiment, filter 236 and ailevatoron mixer 220 may each be partitions within a flight control computer. When pitch command 232 is not passed through scheduler 250 to create symmetry deflection 252, then mixer 256 creates command 254 directly from input from aileron controller 240 without any additions.

Based upon a known configuration for components of a particular model of aircraft, such as without limitation aircraft 100, for any given combination of weight, location of center of gravity, and airspeed, for aircraft 100, moments produced by aircraft 100 components may be sensed by various sensors, or computed based on other sensed components and states of aircraft 100. As a result, at rotation speed for aircraft 100, a magnitude for a moment required to rotate aircraft 100 to a pitch angel 232 required for takeoff (called takeoff attitude) rotation moment 130, will be known as described above.

Hence, for a set rotation speed, and trim 224 of a set value for reduced horizontal stabilizer 132, a particular amount of deflection 234 of elevator 226 needed for rotation of aircraft 100 to the takeoff attitude may be computed by a flight control computer for aircraft 100. Ailevatoron mixer 220 will be configured such that as elevator 226 approaches deflection 234, ailevatoron mixer 220 will issue commands to deflect ailevatoron 138 upward on a schedule such that at deflection 234 of elevator 226 ailevatoron 138 is fully deflected upward.

Ailevatoron mixer 220 is configured such that a magnitude and rate of deflection upward of ailevatoron 138 occurs such that pitch angle 232 for pitch rate 230 for a change in pitch angle 232 for aircraft 100 occurs in a similar manner as would result for aircraft 100 when configured with horizontal stabilizer 116. Conversely, once the aircraft 100 lifts off from surface 102, filter 236 in ailevatoron mixer 220 commands removal of upward deflection of ailevatoron 138 that was input to the effect rotation of nosewheel 108 off of surface 102. Washout 248 may be a filter that removes ailevatoron 138 trailing edge upward deflection, as shown at least by line 214 in FIG. 2. Washout 236 filter is configured to return ailevatoron 138 response and operation to that of a traditional aileron on wing 126.

In some embodiments, ailevatoron 138 response to roll command 246 may be programmed by ailevatoron mixer 220 to differ from a response programmed for traditional ailerons on aircraft 100 before reduced horizontal stabilizer 132, based upon changes in roll dynamic performance of aircraft 100 due to reduced size and/or weight of reduced horizontal stabilizer 132 as compared to horizontal stabilizer 116. Adjustments to previous aileron response after line 238 speed due to reduced horizontal stabilizer 132 may be referred to as adjusted aileron response.

Ailevatoron 138 upward deflection washes out from a maximum value for upward symmetric deflection 252 at rotation of aircraft 100, to no added upward symmetric deflection 252, beyond aileron controller 240 response to roll command 246 input as expected for an aircraft configured without ailevatoron mixer 220. As illustrated, upward symmetric deflection 252 decreases to decrease magnitudes of segment 210 (generated by ailevatoron moment 142) as airspeed increases from rotation speed ($V_r$, line 204) to an airspeed marked by vertical line 238. Vertical line 238 marks the speed at which reduced horizontal stabilizer 132 has the authority to produce pitch moments required to control the pitch of the aircraft, as shown by segment 208 meeting segment 207 in FIG. 2.

Further, ailevatoron mixer 220 can be configured such that ailerons mounted on wing 126 need no modification from a size and range of motion that they are capable of for aircraft 100 with horizontal stabilizer 116. Thus, in an embodiment, an aileron can become an ailevatoron by virtue of being under control of ailevatoron mixer 220.

Where the original size and range of motion for the ailerons and on aircraft 100 is unchanged when horizontal stabilizer 116 is changed to reduce stabilizer 132 the installation of ailevatoron mixer 220 is what changes an aileron to become ailevatoron 138. Although FIG. 2, only shows a single ailevatoron 138 on an outboard (near wing tip—away from fuselage) portion of wing 126, for wings that contain more than one aileron, each aileron can be converted to an ailevatoron 138 by the aileron receiving commands from ailevatoron mixer 220, so long as the aileron is located aft of axis 106.

Thus, the technical effect of ailevatoron mixer 220 and reduced horizontal stabilizer 132 will be that, at rotation speed, aircraft 100 will rotate to the same takeoff attitude at the same pitch rate as aircraft 100 would have with horizontal stabilizer 116 and no ailevatoron mixer 220, such that pitch commands issued to ailevatoron mixer 220 may be unchanged from pitch commands that would be issued to an elevator controller on horizontal stabilizer 116 for aircraft 100. In other words, an operator sending a command to rotate aircraft 100 to a takeoff attitude needs no additional training to issue commands to operate aircraft 100 with ailevatoron mixer 220 and reduced stabilizer 132, at least because the commands an operator would issue are the same as would have been issued to aircraft 100 with horizontal stabilizer 116 and no ailevatoron mixer 220.

Ailevatoron mixer 220 controls ailevatoron 138 by commands to an actuator of ailevatoron 138. In the case where ailevatoron 138 remains the same hardware as the original aileron (or ailerons as applicable) of wing 126, ailevatoron mixer 220 may be configured to act as a supplement or addition to commands from a separate aileron controller 240 that sends commands to the actuator of former aileron, now ailevatoron 138. Alternatively, ailevatoron mixer 220 may be configured to receive commands from aileron controller 240 and process them with other inputs before sending commands to the actuator of ailevatoron 138, such that ailevatoron mixer 220 is the only unit sending commands to the actuator of ailevatoron 138.

Aileron controller 240 and ailevatoron mixer 220 may be configured for "fly-by wire" (FBW) control systems, or for traditional cabled flight control systems that are mechanically connected to a command input device. A fly-by-wire (FBW) system for an aircraft is a system that replaces the traditional flight controls of an aircraft, which are mechanically connected to an input command device, with an electronic interface.

For FBW, the input command device is not connected to the flight control surfaces, engines, or other systems by cables, linkages, or other mechanical systems, as in conventional aircraft. Instead, the movements of flight controls are converted to electronic signals transmitted by wires, optical fibers, over an air-interface, or some combination thereof.

The different components in a fly-by-wire system may communicate with each other using different types of communications architectures. For example, some fly-by-wire systems use wires that connect the components directly to each other. In this example, multiple wires can be used to provide redundant connections between the components.

In other examples, a fly-by-wire system may use a data bus, such as those used in computer systems. The data bus may reduce the amount of wiring between components. Wireless transmission of command signals may also be used.

For example, flight control computers in a fly-by-wire system use signals to identify how to move the actuators for each flight control surface to provide the desired aircraft response to the movement of the flight controls. Further, flight control computers also may perform functions without input from a pilot displacing a control yoke. In place of commands generated by a mechanical displacement of a yoke, command inputs may be generated by a pilot applying pressure onto a control input device, such as without limitation a control wheel steering transducer, a side stick, or a joystick. Further, commands may be generated from other sources, such as without limitation, a flight control computer, and/or a controller linked to the aircraft from outside the aircraft.

An aircraft with a fly-by-wire system can be lighter in weight than when using conventional controls. Electronic systems in a fly-by-wire system require less maintenance as compared to flight control systems using purely mechanical systems and hydraulic systems.

Redundancy is present in fly-by-wire systems for aircraft. Multiple flight control modules in the fly-by-wire system may be used to generate commands in response to receiving signals from the movement of flight control-external sensing devices. The different components in a fly-by-wire system may communicate with each other using different types of communications architectures. For example, some fly-by-wire systems use wires that connect the components directly to each other. In this example, multiple wires can be used to provide redundant connections between the components.

In other examples, a fly-by-wire system may use a data bus, such as those used in computer systems. The data bus may reduce the amount of wiring between components.

Accordingly, in an embodiment with a FBW flight control system, aileron controller 240 may be fully replaced by ailevatoron mixer 220 that receives all signals that would have been intended for aileron controller 240. In such embodiments, ailevatoron mixer 220 would essentially subsume aileron controller function within ailevatoron mixer 220 at a point inside ailevatoron mixer 220 just to the left of mixer 256. Roll command 246 would input directly into ailevatoron mixer 220 prior to mixer 256 and be processed by ailevatoron mixer 220.

Ailevatoron mixer 220 therefore, is configured to act throughout most of flight as would aileron controller 240, but ailevatoron mixer 220 is also configured to deflect ailevatoron 138 upward to provide ailevatoron moment 142 as needed, at relative magnitudes represented by lines 210, to produce required rotation moment 130. As mentioned above, when the program for aileron controller 240 with horizontal stabilizer 116 may need modification due to aerodynamic effects of smaller size of reduced horizontal stabilizer 132, ailevatoron mixer 220 may send signals that adjust commands of aileron controller to adjust for aerodynamic effects of smaller size of reduced horizontal stabilizer 132. The aerodynamic effects may include roll, pitch, or yaw differences that may vary in various flight regimes for aircraft 100. Flight regimes may vary based upon at least an altitude, airspeed, and a configuration of aircraft 100. Configuration may include, without limitation, an extension status of landing gear and/or flaps and/or flaperons, and/or leading-edge devices.

At rotation, ailevatoron 138 upward deflection is biased to deflect ailevatoron 138 on each wing 126 (left and right) on aircraft symmetrically upward. However, ailevatoron mixer 220 also receives roll command 246 inputs and yaw effects 244 for aircraft 100, and if needed, can modulate deflection of ailevatoron 138 on one wing 126 to a deflection that may be asymmetric with deflection of ailevatoron 138 on wing 126 on opposite side of aircraft 100.

Alternatively, if it is desired to change a pitch response to particular rotation commands for aircraft 100, ailevatoron mixer 220 may be configured to receive the same commands that would have been issued for horizontal stabilizer 116 and direct a different pitch response for reduced horizontal stabilizer 132. In other words, a pitch response of aircraft 100 to takeoff commands given to aircraft 100 can be changed via changes made to configuration and/or programming of ailevatoron mixer 220. Configuration and/or programming of ailevatoron mixer 220 may include configuration of schedules of ailevatoron mixer 220.

As an additional feature, to enhance an ability of ailevatoron 138 to affect a pitch rate and magnitude for aircraft 100, a size and/or available degrees of deflection upward for ailevatoron 138 can be increased (relative to previous aileron design) during the aircraft design and manufacture, or as part of a retrofit, that becomes more extensive modification of aircraft 100 than a replacement of only horizontal stabilizer 116 with reduced horizontal stabilizer 132 in ailevatoron mixer 220.

Changes to ailevatoron 138 may include a larger surface, an alternate location, and/or a greater upward deflection capability than provided by aileron design for aircraft 100 before reduced horizontal stabilizer 132. Such increases can provide a greater magnitude for ailevatoron moment 142 than could be produced by previous aileron design (size/shape/location/quantity) for aircraft 100 responding to ailevatoron mixer 220 commands.

With reference to FIG. 3, a graph that represents the relative magnitude of an upward deflection of a trailing edge of an ailevatoron relative to a magnitude of a trailing edge of an elevator deflection in a direction that generates a nose-up pitch for an aircraft is depicted in accordance with an illustrative embodiment. In FIG. 3, vertical axis 302 of graph 300 represents deflection, as a percentage of maximum deflection capable, of elevator on reduced horizontal stabilizer 132 in a direction that generates a nose-up pitch for aircraft 100. Horizontal axis 304 represents upward (away from surface 102(b)) deflection, as a percentage of maximum deflection capable for ailevatoron 138. As mentioned above the schedule would be commanded symmetrically for ailevatoron 138 on each wing 126 of aircraft 100. As discussed for FIG. 2, symmetric deflection 252 of ailevatoron 138 may be scheduled based upon several conditions, FIG. 3 gives an example of values scheduled for symmetric deflection 252 based upon condition of deflection 234 of elevator 226.

For viewing clarity, the bottom of vertical axis 302 represents 50% of elevator deflection towards a nose-up direction limited elevator deflection. The precise relationships of deflections will depend upon flight control characteristics that currently exist for aircraft 100 with horizontal stabilizer 116, or upon a desired design pitch response rotation characteristic for aircraft 100.

Thus the relative representations shown by graph 300 are presented as an example of relative relationships that ailevatoron mixer 220 may be configured to produce. When aircraft 100 is at rotation speed, elevator 226 deflection 234 is at percentage indicated by level 306, which is some percentage less than 100% full deflection in direction that produces a nose-up moment for aircraft 100. As a non-limiting example, level 306 may represent 93% of full deflection, or for another aircraft design, level 306 may represent 95% of full deflection, while on some aircraft level 306 may represent 99% of full deflection, or nearly full deflection of elevator 226.

As elevator deflection approaches level 306, at some level 308, of elevator deflection, ailevatoron mixer 220 receives value of an elevator deflection and initiates upward deflection of ailevatoron 130. The precise value for level 308 is determined by the desired rotation characteristics for aircraft 100. As mentioned above, level 308 may be selected to match the response to commands for horizontal stabilizer 116 or may be selected at a different value to establish a new rotation characteristic for aircraft 100. Thus, particularly when ailevatoron mixer 220 is part of an FBW flight control system, rotation characteristics may even be programmed to vary based upon a crew in command of aircraft 100 or a mission for a given flight of aircraft 100. In other words, a technical effect of ailevatoron mixer 220 is that it provides an efficient mechanism to alter, if desired and/or required, the rotation characteristics for each flight of aircraft 100. Rotation characteristics may include a relationship between a magnitude of a pitch command input to a pitch moment generated, a range 112 allowable for center of gravity 110 at takeoff rotation—and thus a loading of aircraft 100, rotation speed, and/or combinations thereof.

As a non-limiting example level 308 may indicate 80%, 85%, or some other value, of maximum deflection for elevator 226. Further, in an embodiment, and particularly so where ailevatoron mixer 220 is a part of a fly-by-wire flight control system, a value for the airspeed 218 acceleration 242 of aircraft 100 may be received by ailevatoron mixer 220, and a value for level 308 may be determined by ailevatoron mixer 220 based upon the acceleration 242 of airspeed 218 of aircraft 100. Thus, when thrust output from aircraft engines, environmental conditions, tire inflation, or other factors, may influence acceleration 242 of airspeed 218 as aircraft 100 approaches rotation speed, symmetric upward deflection of each ailevatoron 138 may begin at a percentage of elevator 226 deflection 234 that allows ailevatoron 138 to reach level 312 deflection value at rotation speed.

Segment 310 on graph 300 shows how ailevatoron mixer 220 schedules commands for upward deflection of ailevatoron 138 based upon deflection of elevator 226, such that as deflection of elevator 226 reaches level 306, deflection of ailevatoron 138 reaches level 312, which approaches 100% of full upward deflection. Segment 310 may be a line, a curve, and or a curve with a linear portion. Scheduler 250 may also use other charts for other conditions. For example, graph 300 may be used when all other conditions are each at one particular stable value, or for some range of acceptable values for some of the conditions.

Similar to level 308, the precise value for level 312 is determined by the desired rotation characteristics for aircraft 100. As mentioned above, level 312 may be selected to match the response to commands for horizontal stabilizer 116 or may be selected at different value to establish new rotation characteristics for aircraft 100.

As a non-limiting example, level 312 of FIG. 3 may indicate 95%, or 99%, or some other value, of maximum trailing edge upward deflection for ailevatoron 138. Level 312 and/or 306 may each be less than 100% to allow for contingencies of nonstandard conditions that may suddenly occur at rotation speed, such as without limitation wind shifts or gusts, or a sudden loss of thrust by an engine of aircraft 100.

Additionally ailevatoron mixer 220 may be programmed to schedule ailevatoron 138 deflection upwards at just below 100% to generate ailevatoron moment 142 component of rotation moment 130 that allows for some additional upward deflection of ailevatoron 138 if needed to provide some degree of asymmetric ailevatoron 138 deployment if needed to augment roll command 246 and/or yaw effects of aircraft 100 from just prior liftoff of aircraft 100 from surface 102 until just after liftoff.

Thus, ailevatoron mixer 220 provides a novel technical effect necessary for a process for reducing a size of horizontal stabilizer 116 for a particular aircraft model. Ailevatoron mixer 220 provides a novel technical effect of augmenting a nose-up moment, reduced moment 136, for the aircraft, provided by a horizontal stabilizer of a reduced size, reduced horizontal stabilizer 132, for the particular aircraft model, such that rotation moment 130 required to bring nose 128 of aircraft 100 to a takeoff attitude at rotation speed. Ailevatoron mixer 220 and the process enabled thereby, provides a further technical effect of reducing a weight of aircraft 100 by reducing a weight of the horizontal stabilizer mounted on the particular aircraft model, relative to a weight of horizontal stabilizer 116, via using a horizontal stabilizer of a reduced size, reduced horizontal stabilizer 132, for the particular aircraft model.

When aircraft 100 includes a fly-by-wire flight control system, ailevatoron mixer 220 may be a component of a fly-by-wire flight control system. As such, ailevatoron mixer 220 may communicate with or be a part of a flight control computer. As such, ailevatoron mixer 220 may be considered specialized program code operating in a data processing system.

Figure 7:
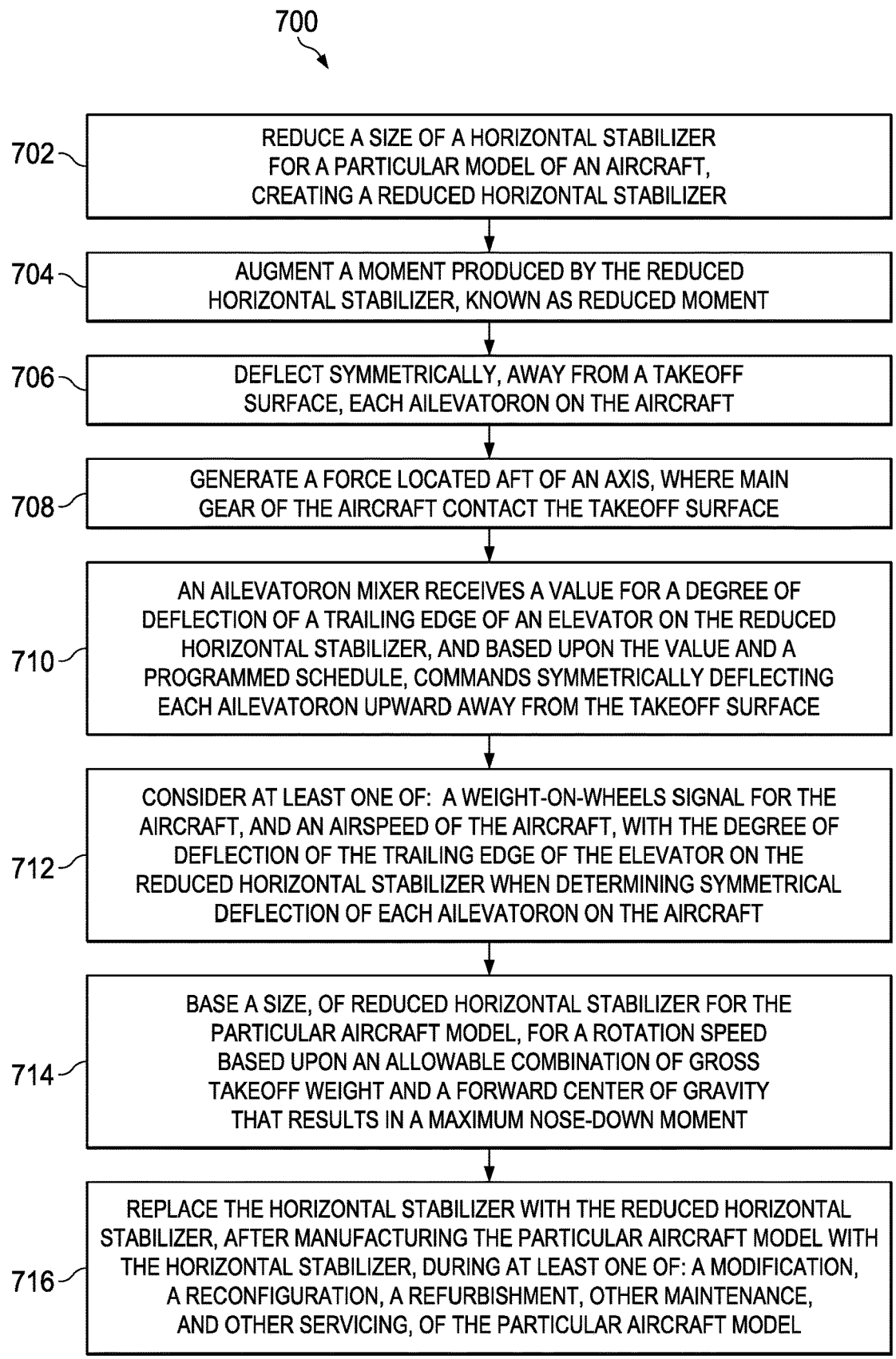
FIG. 7 is an illustration of a flowchart for operations performed by one embodiment for reducing a size of a horizontal stabilizer for a particular model of an aircraft in accordance with an advantageous embodiment.

As part of a fly-by-wire flight control system, ailevatoron mixer 220 may communicate and operate in conjunction with a wing body load alleviation control logic such as described in U.S. Pat. No. 8,024,079, assigned to The Boeing Company, which is incorporated herein in its entirety. In such a configuration, ailevatoron mixer 220 would replace or augment aileron command mixer as depicted in FIG. 7 of U.S. Pat. No. 8,024,079.

Similarly, ailevatoron mixer 220 may communicate and operate in conjunction with a direct lift control system such as without limitation that described in U.S. Pat. Nos. 8,712,606 and 9,415,860, assigned to The Boeing Company. Accordingly, the features presented in U.S. Pat. Nos. 8,712,606 and 9,415,860, assigned to The Boeing Company, are incorporated herein in their entirety.

Similarly, ailevatoron mixer 220 may communicate and operate in conjunction with yaw generating systems such as without limitation those described in U.S. Pat. No. 7,367,530, assigned to The Boeing Company. Accordingly, the features presented in U.S. Pat. No. 7,367,530, assigned to The Boeing Company, are incorporated herein in their entirety.

Figure 4:
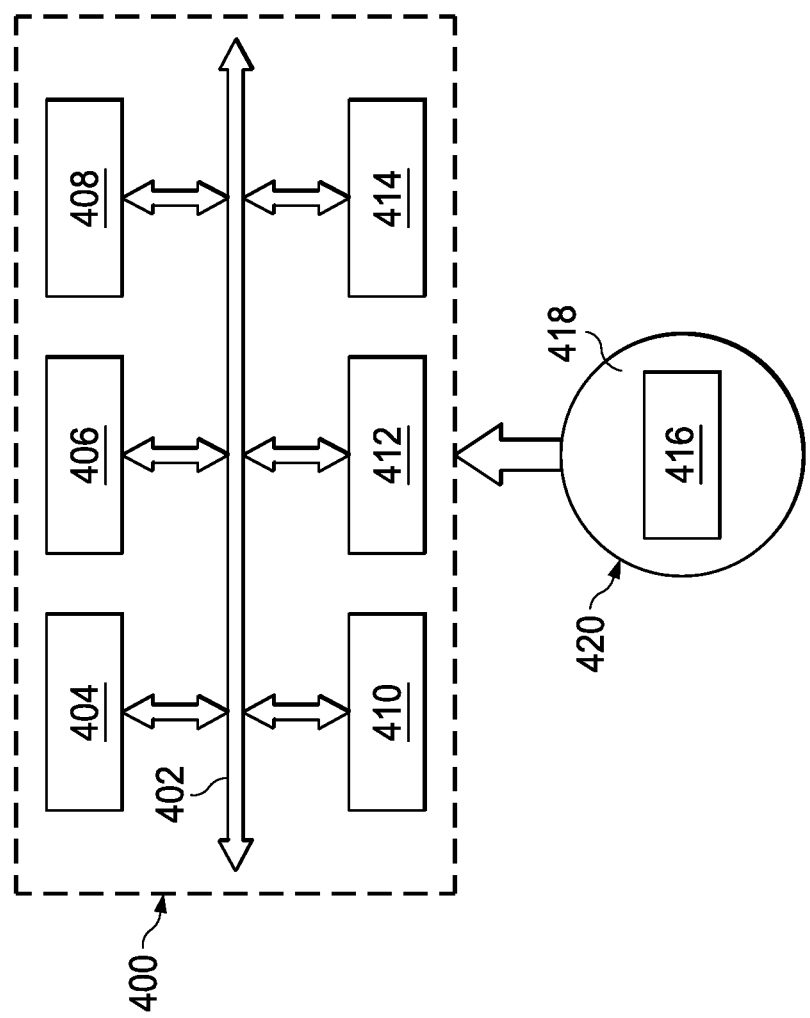
FIG. 4 is an illustration of a diagram of a data processing system for implementing an ailevatoron mixer in accordance with an advantageous embodiment.

Turning now to FIG. 4, a diagram of a data processing system for implementing an ailevatoron mixer 220 is depicted in accordance with an advantageous embodiment. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. In an embodiment, processor unit 404 may represent ailevatoron mixer 220 and may be a set of one or more processors or may be a multi-processor core, depending on the particular implementation. In an embodiment, processor unit 404 may represent a flight control computer and may be a set of one or more processors or may be a multi-processor core, depending on the particular implementation, of which ailevatoron mixer 220 may be a component. In an embodiment, processor unit 404 may represent a flight control system and may be a set of one or more processors or may be a multi-processor core, depending on the particular implementation, of which ailevatoron mixer 220 may be a component.

Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a work interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which computer may be located in a memory, such as memory 406. These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form, such as, for example, an optical or magnetic disc that is inserted or placed into a drive or other device that is part of persistent storage 408 for transfer onto a storage device, such as a hard drive that is part of persistent storage 408. In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

As one example, a storage device in data processing system 400 is any hardware apparatus that may store data. Memory 406, persistent storage 408 and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

When ailevatoron mixer 220 is a part of or in communication with a fly-by-wire flight control system, commands sent from ailevatoron mixer 220 to ailevatoron 138 may be scheduled in response to commands input to not only reduced horizontal stabilizer 132, but to other flight controls as well, such as without limitation flaps, flaperons, rudders, and/or spoilers on aircraft 100. Additionally, commands sent from ailevatoron mixer 220 to ailevatoron 138 may be scheduled in response to current positions of each flight control surface of aircraft 100. Additionally, ailevatoron mixer 220 may send commands not only to ailevatoron 138, but to a controller and/or a mixer of any other flight control surface on the aircraft. It is understood that commands sent to flight control surface may be sent to a respective actuator for the respective flight control surface.

Figure 5:
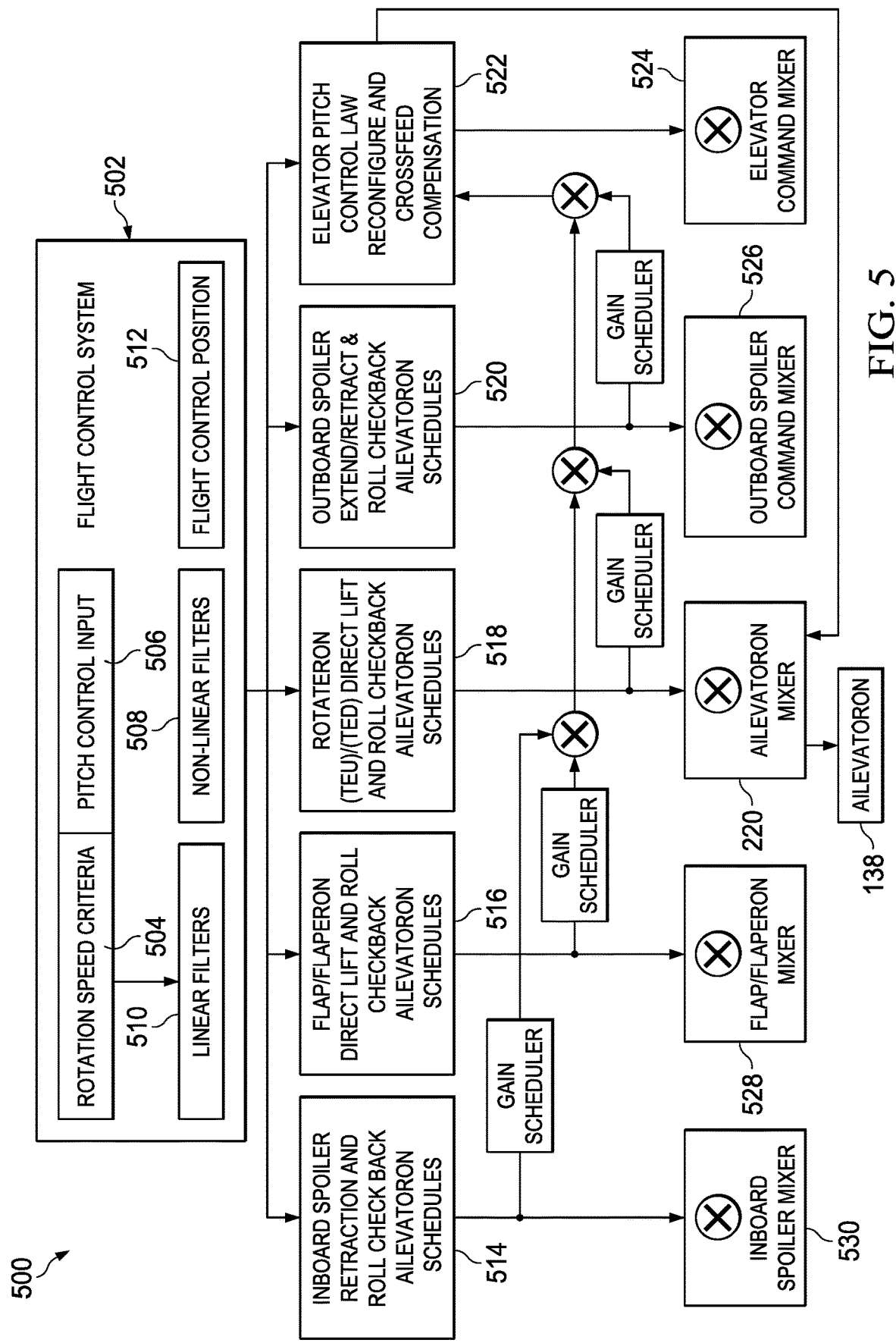
FIG. 5 is a functional schematic diagram of an ailevatoron mixer control and logic in accordance with an advantageous embodiment.

FIG. 5 is an illustration of a functional schematic diagram of an ailevatoron mixer control and logic depicted in accordance with an advantageous embodiment. Functional schematic 500 illustrates ailevatoron mixer 220 control integration with aircraft 100 that may contain a fly-by-wire flight control system. Ailevatoron mixer 220 communicates with flight control system 502. Flight control system 502 may contain (as shown in FIG. 5), receive, be in communication with, and/or compute at least rotation speed criteria 504 and flight control inputs 506 and may contain non-linear filters 508 and linear filters 510 and/or a flight control position 512, that each may form a part of status of aircraft 100 analyzed by scheduler 250 in ailevatoron mixer 220 to determine output of ailevatoron mixer 220 to ailevatoron 138 and/or other flight controls.

Rotation speed criteria 504 may include, without limitation: an indicated airspeed for rotation, a trim setting for reduced horizontal stabilizer 132 for rotation, an engine thrust, a pressure altitude, a weight of aircraft, a weight-on-wheels signal 222, a configuration of aircraft 100, a location of center of gravity 110 (cg) of aircraft 100, a length of surface 102, a slope of surface 102, a rotation rate for aircraft 100, and/or a rotation pitch target for aircraft 100. Pitch control input 506 may be from a flight control device inside the aircraft, or from an autopilot command, and/or from a datalink input to aircraft 100 and/or ailevatoron mixer 220.

Linear filters 510 may include, without limitation, notch filters to minimize structural coupling. Linear filters 510 and non-linear filters 508 filter out (or minimize) high gain feedback commands from wing structural modes above one hertz. The feedback allows compensations to scheduled commands for lift and pitching moment changes due to control inputs and/or atmospheric disturbances.

In one embodiment, a moving time window associated with the set of linear filters 510 and non-linear filters 508 may be added to block selected frequency signals. The time can be adjusted for a faster response time or to block higher frequencies. The time may be a function of aircraft state, flight conditions, structural modes frequencies, and/or weight of aircraft 100. Ailevatoron mixer 220 schedule inputs are schedules for extending and retracting control surfaces to supplement reduced moment 136 generated by reduced horizontal stabilizer 132.

Ailevatoron mixer 220 scheduler 250 may, without limitation, receive inputs from or send output to other flight controls in addition to ailevatoron 138. As a reminder, discussions in regard to ailevatoron 138 are representative of each ailevatoron 138 on each wing, and if so installed, multiple ailevatorons on each wing.

Ailevatoron mixer 220 may communicate with other flight control mixers based upon: inboard spoiler retraction and roll check back ailevatoron schedules 514, flap and/or flaperon direct lift and roll checkback ailevatoron schedules 516, ailevatoron 138 trailing edge up (TEU)/trailing edge down (TED) direct lift and roll checkback ailevatoron schedules 518, outboard spoiler extend/retract & roll checkback ailevatoron schedules 520, and elevator pitch control law reconfigure and crossfeed compensation 522. Ailevatoron mixer 220 scheduler 250 selects a schedule for determining a magnitude for symmetric deflection 252 based on a combination of aircraft 100 dynamics, aircraft 100 current state, and aircraft 100 payload.

The ailevatoron mixer 220 utilizes scheduler 250 to allow for minimizing reduced moment 136 as compared to stab moment 124 for any required rotation moment 130. Ailevatoron 138 TEU/TED direct lift and roll checkback ailevatoron schedules 518 may include one or more schedules for commanding ailevatoron(s) 138 symmetric trailing edge up deployment (TEU) deployment to generate force 140 and thus ailevatoron moment 142. Outboard spoiler extend/retract and roll checkback ailevatoron schedules 520 may include one or more schedules for commanding outboard spoilers to extend and/or retract to maximize ailevatoron moment 142 while maintaining commanded roll control.

Elevator pitch control law reconfigure and crossfeed compensation 522 may include schedules for feedback and crossfeed to one or more elevators via an elevator command mixer 524 to compensate for ailevatoron moment 142 and pitching moment changes. Ailevatoron mixer 220 communication with other flight controls may be via: outboard spoiler command mixer 526 flap and/or flaperon command mixer 528, and/or inboard spoiler command mixer 530. Each communication and schedule may be further adjusted by a respective gain schedule as shown in FIG. 5.

An ailevatoron mixer 220 may also be configured to the same effect for an aircraft without fly-by-wire controls. In an aircraft with conventional cable controls, connected to conventional pilot yoke input devices, ailevatoron mixer 220 may still receive trim setting of reduced horizontal stabilizer 132, a weight-on-wheels signal 222 and aircraft 100 airspeed inputs and recognize a rotation pitch command to the elevators, and upon recognizing elevator deflection reaching level 308, mechanically blending in a deflection upward, away from the surface 102, ailevatoron 138 along a schedule such as indicated by graph 300.

Similarly, in non-fly-by-wire aircraft, ailevatoron mixer 220 may have mechanical mixer valves to incorporate roll control inputs to aircraft 100 into deflection of ailevatoron 138 to an effect similar to that described above. It is understood that the replacement of electronic processing for schedules of ailevatoron mixer 220 with mechanical mixer valves and cables will increase mechanical component requirements of an ailevatoron mixer 220 system, and thus an overall weight, as compared to a fly-by-wire configuration.

Thus, described above is at least a novel machine configured to reduce a size of horizontal stabilizer 116 for a particular aircraft model while generating and sustaining a nose-up moment, required for takeoff, for the particular aircraft model loaded at a combination of gross takeoff weight 122 and center of gravity 110 located at a forward location allowed in range 112 of allowable center of gravity locations, that results in a maximum required rotation moment 130, such that the machine comprises ailevatoron mixer 220 configured to symmetrically deflect ailevatoron(s) 138, located aft of axis 106 of contact of main gear 104 of aircraft 100, away from surface 102. An embodiment of the machine also includes a flight control computer that comprises program code fixed in a non-transitory medium configured to blend symmetric deflection of a trailing edge, of ailevatoron(s) 138 away from surface 102, based upon at least: deflection of elevator 226 on reduced horizontal stabilizer 132, an airspeed, and a weight-on-wheels signal, of the particular aircraft model.

Figure 6:
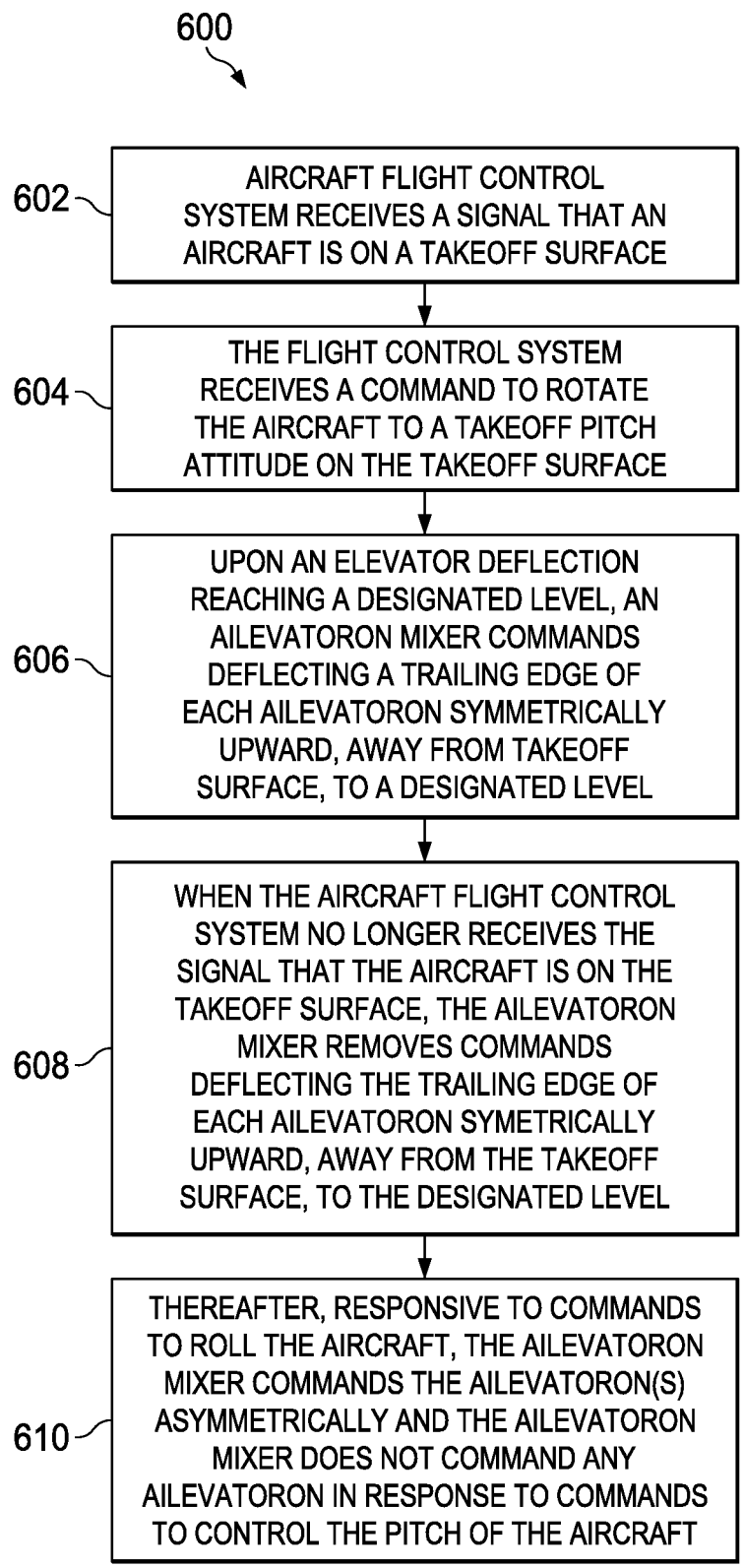
FIG. 6 is an illustration of a flowchart for operations performed by one embodiment for reducing a size of a horizontal stabilizer for a particular aircraft model in accordance with an advantageous embodiment.

With reference now to FIG. 6, an illustration of a flowchart for operations performed by one embodiment for reducing a size of a horizontal stabilizer for a particular aircraft model is depicted in accordance with an advantageous embodiment.

Hence, process 600 may begin when an aircraft flight control system receives a signal that an aircraft is on a takeoff surface (operation 602). The signal may come from a weight-on-wheels sensor, or any appropriate sensor that recognizes that aircraft 100 main gear 104 are supporting weight of aircraft 100 on surface 102. Flight control system may include a flight control computer, and/or a controller and/or a mixer and/or an actuator unit for each and/or for any flight control in the flight control system.

In process 600, the flight control system may receive a command to rotate the aircraft to a takeoff pitch attitude on the takeoff surface (operation 604). The command may direct deflecting elevator 226 located on reduced horizontal stabilizer 132.

Upon an elevator deflection reaching a designated level, an ailevatoron mixer commands deflecting a trailing edge of each ailevatoron symmetrically upward, away from the takeoff surface, to a designated level (operation 606). Designated level 312 may be 100% deflection, or some percentage less than 100%, based upon a schedule for commanding deflection of ailevatoron 138 relative to deflection of elevator 226.

Responsive to the aircraft flight control system no longer receiving the signal that the aircraft is on the takeoff surface, the ailevatoron mixer removes commands deflecting the trailing edge of each ailevatoron symmetrically upward, away from the takeoff surface, to the designated level (operation 608). Removing commands deflecting a trailing edge of each ailevatoron 138 symmetrically upward, away from surface 102, to a designated level 312, may be scheduled as a blended reduction relative to deflection of elevator 226, as illustrated by FIG. 2.

Thereafter, in process 600, and responsive to commands to roll the aircraft, the ailevatoron mixer commands each ailevatoron asymmetrically, and the ailevatoron mixer does not command deflecting any ailevatoron in response to commands to control the pitch of the aircraft (operation 610). As described above in detail, the ailevatoron mixer asymmetric commands to the ailevatoron will be comparable to commands to an aileron on a particular aircraft model by an aileron mixer or aileron controller before the particular aircraft model had a reduced horizontal stabilizer and the ailevatoron mixer installed. This may be achieved by the aircraft retaining aileron mixer commands reaching the ailevatoron without addition deflection commanded by the ailevatoron mixer, or by an aileron mixer and/or controller being subsumed within or replaced by the ailevatoron mixer. In other words, without limitation, FIG. 6 relates at least to a process and machine for reducing a drag component of a horizontal stabilizer on an aircraft.

Referring now to FIG. 7, an illustration of a flowchart for operations performed by one embodiment for reducing a size of a horizontal stabilizer for a particular model of an aircraft is depicted. The operations are represented by flowchart 700 that shows reducing a size of horizontal stabilizer 116 for a particular model of aircraft 100 creating a reduced horizontal stabilizer (operation 702) and replacing horizontal stabilizer 116 with reduced horizontal stabilizer 132.

Operations performed by embodiment shown by flowchart 700 continue by augmenting a moment produced by the reduced horizontal stabilizer 132, known as reduced moment 136 (operation 704) via a deflection, away from surface 102, of ailevatoron 138. In an embodiment, ailevatoron 138 may be an aileron already mounted on aircraft 100, under the control of the ailevatoron mixer 220, such that each aileron that is located aft of axis 106 functions as ailevatoron 138, configured for deflecting symmetrically, with ailevatoron 138 on wing 126 mounted on other side of aircraft 100, away from surface 102 (operation 706).

Thus, a technical effect of ailevatoron mixer 220 is to utilize and control the previously mounted ailerons, newly as ailevatoron(s) 138 on aircraft 100. Additionally, each previously mounted aileron may also be redesigned and/or replaced with newly sized and/or configured ailevatoron 138 tailored for aircraft 100 with reduced horizontal stabilizer 132.

A further technical effect of reducing a size of horizontal stabilizer 116 on aircraft 100 will be to reduce a weight of aircraft 100 via a reduced weight of smaller reduced horizontal stabilizer 132 relative to horizontal stabilizer 116. Reduction in aircraft weight provides, without limitation, the technical effect of improving performance of aircraft 100 with reduced horizontal stabilizer 132 as compared at least to aircraft 100 with horizontal stabilizer 116. Without limitation, improved performance may include increasing: a range, an operating ceiling, a takeoff payload, a capability to accelerate, and/or a fuel efficiency; as well as reducing: a drag, a rotation speed, and/or a takeoff distance required, for aircraft 100.

Deflecting each ailevatoron 138 upward away from surface provides the technical effect of generating a force 140 located aft of axis 106, where main gear 104 of aircraft 100 contact the surface 102 (operation 708). Ailevatoron mixer 220 receives a value for the degree of deflection 234 of a trailing edge of elevator 226 on reduced horizontal stabilizer 132, and based upon the value and a programmed schedule, commands symmetrically deflecting a trailing edge of each ailevatoron 138 upward away from surface 102 (operation 710). The programmed schedule of the ailevatoron mixer 220 may be an algorithm in a computer program within a processor.

Ailevatoron mixer 220 may be considered a component within a flight control computer and/or a flight control system. Alternately, ailevatoron mixer 220 program schedule may be mechanically programmed into ailevatoron mixer 220 that mechanically blends commands for deflection of a trailing edge of elevator 226 with ailevatoron 138 deflection while aircraft main gear 104 contact the runway, surface 102.

Flowchart 700 may also include deflecting symmetrically, away from surface 102, a trailing edge of each ailevatoron 138 on aircraft 100 based upon a degree of deflection of elevator 226 on reduced horizontal stabilizer 132 according to a determination in ailevatoron mixer 220 and at least one of: a weight-on-wheels signal 222, an airspeed 218 of aircraft 100, and an acceleration rate of the aircraft (operation 712).

Further, operations performed by embodiment shown by flowchart 700 may include basing a size, of reduced horizontal stabilizer 132 for the particular aircraft model, for a rotation speed based upon an allowable combination of gross takeoff weight and a forward center of gravity that results in a maximum nose-down moment (operation 714). An allowable combination includes a gross takeoff weight, and a center of gravity location toward a forward end of a range, that are allowed by government regulation and/or certification, and/or aircraft manufacturer's operating limits.

Although reduced horizontal stabilizer 132 may be designed into aircraft 100 before manufacturing begins, reducing the size of the horizontal stabilizer for a particular aircraft model may occur by replacing the horizontal stabilizer with the reduced horizontal stabilizer, after manufacturing the particular aircraft model with the horizontal stabilizer, during at least one of: a modification, a reconfiguration, a refurbishment, other maintenance, and other servicing, of the particular aircraft model (operation 716).

Figure 8:
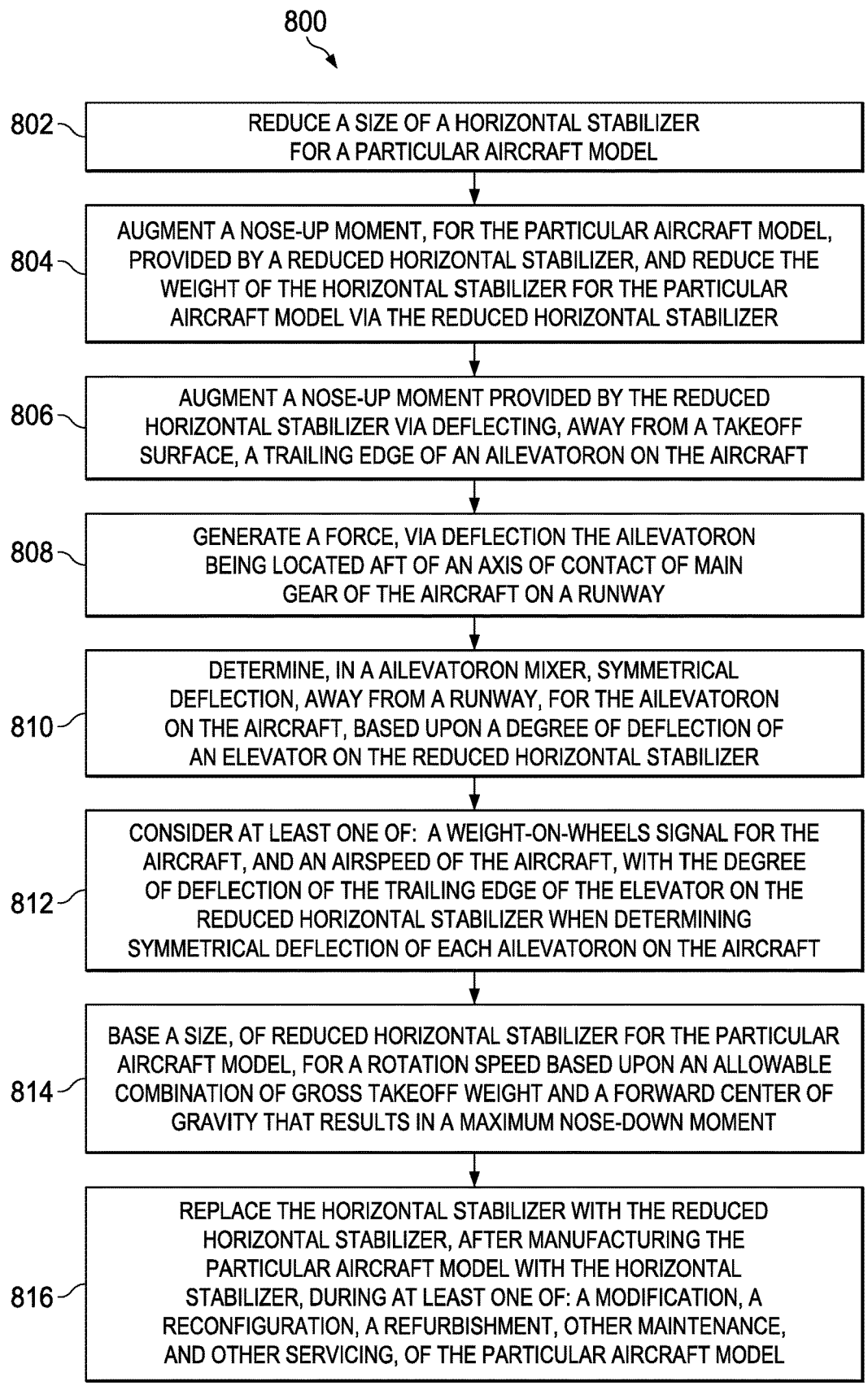
FIG. 8 is an illustration of a flowchart for operations performed by one embodiment for increasing the fuel efficiency for a particular aircraft model in accordance with an advantageous embodiment.

Referring now to FIG. 8, an illustration of a flowchart for operations performed by one embodiment for increasing the fuel efficiency for a particular model of an aircraft is depicted. Operations performed by embodiment shown by flowchart 800 begin via reducing a size of a horizontal stabilizer for a particular aircraft model (802). Application of the ailevatoron mixer 220 and components and processes associated therewith for a particular aircraft model may result in reductions of drag during flight produced by reduced horizontal stabilizer 132 in the range of 5-10% for the aircraft model as compared to drag produced by horizontal stabilizer 116 used before replacing horizontal stabilizer 116 with reduced horizontal stabilizer 132. The reduced drag may be profile drag. Still further size reduction for reduced horizontal stabilizer 132 and drag reductions may be possible when coupled with the novel machine and process of U.S. patent application Ser. No. 14/921,841, from the inventor of this application, which is fully incorporated by reference herein. The reduced drag may be profile drag. Such further reductions may be due at least to a reduction in sizing requirements that are currently driven by nose-down pitch control requirements, such as found without limitation, in 14 CFR § 25, for aircraft stall response handling.

Operations performed by embodiment shown by flowchart 800 continue by augmenting a nose-up moment, for the particular aircraft model, provided by a reduced horizontal stabilizer, and reducing the weight of the horizontal stabilizer for the particular aircraft model via the reduced horizontal stabilizer (operation 804). Reducing a size required for horizontal stabilizer 116 may have the technical effect not only of reducing the weight of reduced horizontal stabilizer 132 and aircraft 100 based upon use of similar materials, but may also reduce the weight because the reduced size may allow for construction of reduced horizontal stabilizer 132 with a type of support and/or a type of materials that weighs less than those used for horizontal stabilizer 116. The reduced weight support and materials needed for reduced horizontal stabilizer may result from changes in both aerodynamic and gravitational loading on the reduced horizontal stabilizer 132. Hence, the novel machine and process described herein may result in a reduced horizontal stabilizer for a particular model of an aircraft that weighs from 1-10% less than a horizontal stabilizer required for the particular aircraft without utilizing the ailevatoron mixer 220 and related components and/or processes described herein.

Operations performed by embodiment shown by flowchart 800 continue by augmenting a nose-up moment provided by the reduced horizontal stabilizer 132 via deflecting, away from surface 102, a trailing edge of ailevatoron 138 on aircraft 100 (operation 806). Operations continue by augmenting the nose-up moment via generating a force, via the deflection the ailevatoron(s) 138 being located aft of axis 106 of contact of main gear 104 of aircraft 100 on surface 102 (operation 808).

Operations performed by the embodiment shown by flowchart 800 continue by deflecting symmetrically, away from surface 102, ailevatoron(s) 138 on aircraft 100 based upon a degree of deflection, of elevator 226 on reduced horizontal stabilizer 132, according to a determination in ailevatoron mixer 220(operation 810). Determination in may be based upon factors described above. Ailevatoron mixer 220 may be in communication with or part of a flight control computer for a fly-by-wire flight control system. In an embodiment, ailevatoron mixer 220 may be a mechanical device that receives mechanical inputs from input device to control pitch of aircraft 100 when on surface 102. As used herein, surface 102 may be a runway, or any surface used by aircraft 100 for takeoff roll, rotation, and lift off.

Operations performed by an embodiment shown by flowchart 800 continue by deflecting symmetrically, away from a runway, each ailevatoron on the particular aircraft model based upon a degree of deflection of an elevator on the reduced horizontal stabilizer according to a determination by an ailevatoron mixer considering at least: a weight-on-wheels signal, and an airspeed of the particular aircraft model (operation 812). Operations continue by basing the size of the reduced horizontal stabilizer, for a maximum nose-down moment for the particular aircraft model, resulting from a particular combination of gross takeoff weight and a maximum allowable forward center of gravity, upon a rotation speed for the particular aircraft model (operation 814).

Operations performed by an embodiment shown by flowchart 800 continue by reducing the size of the horizontal stabilizer 116 for a particular aircraft model by replacing horizontal stabilizer 116, after manufacturing the particular aircraft model using the horizontal stabilizer 116, with reduced horizontal stabilizer 132 during at least one of: a modification, a reconfiguration, a refurbishment, other maintenance, and other servicing, of the particular aircraft model (operation 816).

Additionally, an embodiment may at least provide operations for supplementing reduced moment 136 generated by reduced horizontal stabilizer 132 for aircraft 100. Use of reduced horizontal stabilizer 132 may provide the technical effect of reducing a takeoff airspeed, or increasing a takeoff payload, for aircraft 100, at least via a reduction in an empty operating weight of aircraft 100.

Additionally, the process and machine described above provide the technical effect of supplementing a pitch moment produced by a given horizontal stabilizer for a given aircraft. Further, the ailevatoron mixer 220 may provide a means for providing a stall recovery means for aircraft 100 that may allow for further reduction of a size of the horizontal stabilizer.

Additional technical effects also result from ailevatoron mixer 220 adding symmetric deflection 252 into command 254 for activation of ailevatoron 138. The additional nose-up moment generated by various degrees of symmetric deflection 252 of ailevatoron 138 can also be applied to provide mitigation of some failure modes at rotation speed for aircraft 100, and/or expand a range for allowable takeoff trim positions for a horizontal stabilizer of any given size.

As a non-limiting example, FIG. 2 can also be used to represent the benefit of ailevatoron 138 symmetric deflection 252 when horizontal stabilizer trim 224 is in a position beyond its normal operating range for an aircraft 100 without ailevatoron mixer 220. If aircraft 100 did not have a retrofit of reduced horizontal stabilizer 132, but did have ailevatoron mixer 220 installed, then horizontal stabilizer 116 could use a takeoff trim 224 setting outside of a previously allowable range, such that during takeoff roll, horizontal stabilizer 116 at trim 224 setting outside of a previously allowable range would produce magnitudes of a nose-up rotation moment similar to segment 208 in FIG. 2 instead of the magnitudes shown for segment 207 that represents magnitudes for horizontal stabilizer 116 with trim 224 at a previously normal setting for takeoff. At rotation speed, ailevatoron 138 symmetric deflection 252 would provide the additional nose-up moment magnitude needed to meet the required level 206. Thus, ailevatoron mixer 220 and ailevatoron 138 not only provide the technical effect of allowing a reduction in a size of horizontal stabilizer 116, but also allow for an expansion of allowable takeoff trim 224 settings for horizontal stabilizer 116—or for reduced horizontal stabilizer 132. Even without changing a size of horizontal stabilizer 116, changing a setting for trim 224 of horizontal stabilizer 116 for takeoff can reduce drag produced by horizontal stabilizer 116 during takeoff, and thus improve performance and/or reliability for aircraft 100 via reducing either a takeoff distance required and/or a thrust required for takeoff.

Further, both technical effects can be achieved in varying degrees simultaneously. With ailevatoron mixer 220, a reduction in a size of horizontal stabilizer 116 to some intermediate size, between horizontal stabilizer 116 and reduced horizontal stabilizer 132, would allow for the intermediate size horizontal stabilizer to operate with an expanded range of allowable takeoff trim 224, as compared to operation of the intermediate size horizontal stabilizer without ailevatoron mixer 220.

Similarly, ailevatoron mixer 220 provides the technical effect of affording protections for certain failure modes of certain aircraft systems during takeoff. As shown in FIG. 3, when level 312 designed for symmetrical deflection 252 for a given rotation speed and trim 224 setting lies below a value of 100%, then some extra amount of nose-up moment may be generated by ailevatoron 138 above that shown by the intersection of segment 210 and $V_r$ line 204 in FIG. 2. Hence, in the event of some failure mode, such as without limitation, a mis-set trim 224 position for reduced horizontal stabilizer 132 (or horizontal stabilizer 116 on an aircraft with ailevatoron mixer 220 but no reduced horizontal stabilizer 132) and/or a jammed elevator 226 that inhibits achieving desired deflection 234 required to produce planned takeoff rotation performance indicated by segment 208 (or segment 207) in FIG. 2, then, ailevatoron mixer 220 could direct an additional symmetric deflection 252 (shown as available by the distance between level 312 and 100% in FIG. 3) to increase the magnitude of 210 produced by ailevatoron moment 142 being provided by ailevatoron 138. Thus, even if segment 208 (or 207) intersected $V_r$ line 204 at a lower level, ailevatoron mixer 220 could provide the technical effect whereby segment 210 could be further augmented to a higher level above original design to compensate for the drop in magnitude of segment 208 (or 207).

Alternatively, a takeoff failure mode may alter FIG. 2 by moving the magnitude of level 206 upward. As a non-limiting example, a dragging brake/deflated tire or a takeoff thrust below planned magnitude may change rotation moment 130 and thus alter FIG. 2 by moving the magnitude of level 206 upward. As above, ailevatoron mixer 220 could direct an additional symmetric deflection 252 (shown as available by the distance between level 312 and 100% in FIG. 3) to increase the magnitude of 210 produced by ailevatoron moment 142 being provided by ailevatoron 138. Thus, even if level 206 rises above a planned magnitude, ailevatoron mixer 220 could provide the technical effect whereby segment 210 could be further augmented to a higher level above original design to compensate for the rise of level 206 due to some takeoff failure condition on aircraft 100. Thereby, ailevatoron mixer 220 provides for enhanced nose-up pitch authority for aircraft 100 at rotation that provides mitigation of failure modes within aircraft 100 components that affect rotation moment 130 for aircraft 100, as well as improving aircraft 100 performance via allowing a reduction in size of horizontal stabilizer 116, and/or expanded allowable trim settings for horizontal stabilizer 116 or reduced horizontal stabilizer 132.

Figure 9:
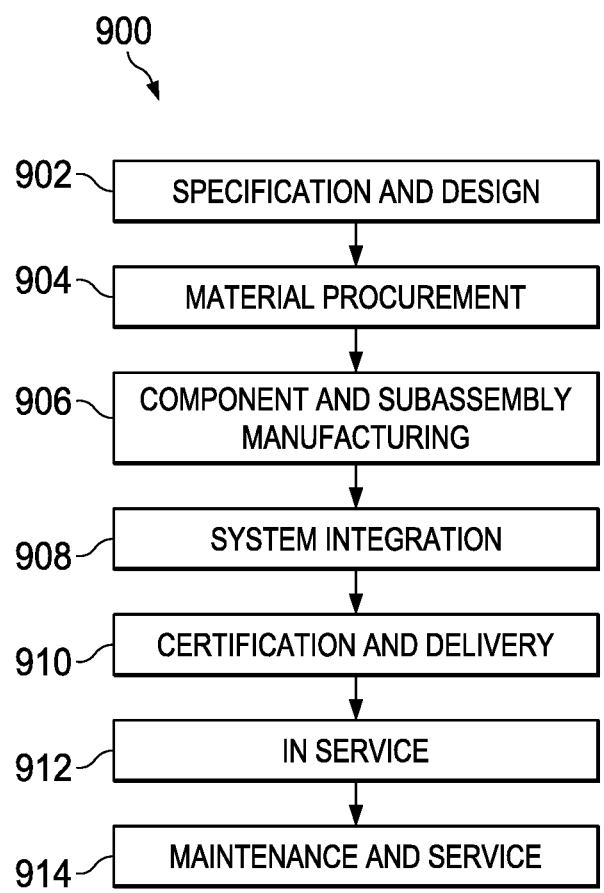
FIG. 9 shows a diagram illustrating operations of an embodiment for an aircraft manufacturing and service method in accordance with an advantageous embodiment.

Embodiments of the disclosure may be described in the context of the aircraft manufacturing and service operations 900 as shown in FIG. 9 for aircraft 100 as shown in FIG. 1. FIG. 9 shows a diagram illustrating operations of an embodiment for an aircraft manufacturing and service method, depicted in accordance with an advantageous embodiment. During pre-production, operations for aircraft manufacturing and service operations 900 may include specification and design 902 of aircraft 100 in FIG. 1 and material procurement 904.

During production, component and subassembly manufacturing 906 and system integration 908 of aircraft 100 in FIG. 1 takes place. Thereafter, aircraft 100 in FIG. 1 may go through certification and delivery 910 in order to be placed in service 912. While in service by a customer, aircraft 100 in FIG. 1 is scheduled for routine maintenance and service 914, which may include modification, reconfiguration, refurbishment, and other maintenance or service.

Each of the processes of aircraft manufacturing and service operations 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and without limitation an operator may be an airline, leasing company, military entity, service organization, and so on.

Machines and processes embodied herein may be employed during any one or more of the stages of aircraft manufacturing and service method 900 in FIG. 9. For example, components or subassemblies produced in component and subassembly manufacturing 906 in FIG. 9 may be fabricated or manufactured in a manner similar to components or subassemblies produced while aircraft 100 is in service 912 in FIG. 9.

Also, one or more apparatus embodiments, method embodiments, or a combination thereof may be utilized during production stages, such as component and subassembly manufacturing 906 and system integration 908 in FIG. 9, for example, without limitation, by substantially expediting the assembly of or reducing the cost of aircraft 100. Similarly, one or more of apparatus embodiments, method embodiments, or a combination thereof may be utilized while aircraft 100 is in service 912 or during maintenance and service 914 in FIG. 9.

Additionally, the illustrative embodiments recognize and take into account one or more different considerations. For example, the illustrative embodiments recognize and take into account that the use of buses, such as those used in computers, is becoming more common in aircraft. For example, special flight control programs in a computer processor may send commands to a special actuator control program in a processor that controls a device in the aircraft. An actuator control program may control, for example, a flight control surface, an engine, or some other suitable device in the aircraft that may affect a change in pitch attitude or rate of an aircraft.

The illustrative embodiments also recognize and take into account that a bus may be a parallel bus or a serial bus. When a parallel bus is used, units of data, such as a word, may be carried on multiple paths in the bus. Thus, the illustrative embodiments provide a method and apparatus for controlling flight control surfaces on an aircraft.

A flight control system may contain a data bus system, an actuator control, and individual mixers in communication with each actuator. The data bus system is located in aircraft 100, and may be a part of a flight control computer and/or ailevatoron mixer 220.

The actuator control modules are connected to the data bus system. An actuator control in the actuator may control positioning of a group of flight control surfaces on aircraft 100 using commands via the data bus system that are directed to the actuator. Flight control programs and/or schedules may be connected to the data bus system. The flight control programs may generate and send the commands onto the bus system to control the flight control surfaces on the aircraft. The commands for a flight control surface may be directed towards a group of actuator control programs on processors assigned to the actuators of the flight control surfaces.

Flight control surfaces such as reduced horizontal stabilizer 132 and/or ailevatoron 138 may be controlled by actuators which may be implemented in software, hardware, firmware or a combination thereof. When software is used, the operations performed by actuator controllers may be implemented in program code configured to run on hardware, such as a processor unit. When firmware is used, the operations performed by actuator control programs and/or flight control programs, which may be implemented in program code and data and stored in persistent memory to run on a processor unit. When hardware is employed, the hardware may include circuits that operate to perform the operations in actuator control programs and flight control programs.

In the illustrative examples, without limitation the hardware for the processor units may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices that may be used for processor units include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, each of flight control programs may part of processor units that are dissimilar to each other and each of actuator control program may include processor units that are dissimilar to each other. For example, one processor unit in the module may be implemented using a computer microprocessor while the other processor in the module may be implemented using a digital signal processor. As another example, two computer microprocessors may be used having different processor architectures.

The illustrations are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, a portion of a flight control system may use conventional controls in addition to a fly-by-wire system. Further, a flight control computer may control other types of devices other than flight control surfaces discussed in the figure. For example, the flight control computer also may control the engines on aircraft 100.

As yet another example, a network may be used in addition to or in place of data bus system to provide communications between actuator control programs and/or flight control programs. Further, some number of flight control sub-programs may be used as supplements to the systems and programs described herein for some illustrative examples. The operations illustrated in FIGS. 6-9 may be implemented in aircraft 100 described in FIG. 1.

Operations shown receiving a signal and/or a command from an input device may be from a of flight control in a cockpit of aircraft 100. These signals may be analog signals, digital signals, some combination thereof, or signals transmitted mechanically via a cable, pulley, linkage, or similar device. These signals may be generated from flight controls such as a flight stick, rudder pedals, a throttle, or some other suitable type of control. Flight controls may be controls operated by a pilot, and/or by another operator and/or system within or data linked from outside aircraft 100. In other illustrative examples, the flight controls may be devices sending sensor data or other information needed in the flight control modules to provide automatic adjustments to the flight of aircraft without input from the pilots. Flight control devices may send the commands onto a data bus system that may be within or in communication with ailevatoron mixer 220 for flight control operations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide a method and apparatus for managing commands for flight control surfaces. One or more illustrative embodiments may use fly-by-wire systems for aircraft. The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A process for supplementing a nose-up pitch authority at rotation on takeoff for an aircraft comprising:
    a tricycle configured landing gear comprising main gear; and
    wings mounted on, and separated from a horizontal stabilizer by a fuselage, the horizontal stabilizer configured to generate a moment, about an axis defined by contact points of the main gear of the aircraft with a takeoff surface, in an aircraft nose-up direction, the process comprising:
    adding an ailevatoron mixer to the aircraft for controlling an ailevatoron, respectively on each wing of the wings, located aft of the axis and configured to generate an ailevatoron moment about the axis, the ailevatoron mixer comprising a filter and a scheduler specially programmed for:
        receiving inputs that comprise: a flight control position, rotation speed criteria, aircraft performance, and flight control commands;
        determining, using the inputs, a rotation moment required for rotating a nose of the aircraft off the takeoff surface for takeoff;
        responsive to the moment generated by the horizontal stabilizer being less than the rotation moment, determining a magnitude required for the ailevatoron moment, such that a sum of the moment produced by the horizontal stabilizer and the ailevatoron moment equals the rotation moment;
        determining a deflection, away from the takeoff surface, required for the ailevatoron, respectively on each wing of the wings, to generate a force generating the magnitude required for the ailevatoron moment; and
        commanding a symmetric deflection of each ailevatoron away from the takeoff surface to the deflection determined.

2. The process of claim 1, further comprising:
    adding to the aircraft a mixer configured for:
        receiving: a roll command and the magnitude required for the symmetric deflection; and
        mixing the roll command with the magnitude required for the symmetric deflection and forming a command to the ailevatoron, respectively on each wing of the wings, that generates the ailevatoron moment.

3. A process for supplementing a nose-up pitch authority at rotation on takeoff for an aircraft comprising:

reducing a size of a horizontal stabilizer on a particular model of an aircraft comprising: a left wing and a right wing, each wing respectively comprising an ailevatoron and extending from opposite sides of a fuselage extending away from the left wing and the right wing and supporting the horizontal stabilizer designed for the particular model of the aircraft for overcoming a maximum allowed nose-down a takeoff weight moment at takeoff;

replacing the horizontal stabilizer for the particular model of the aircraft with a reduced horizontal stabilizer comprising a smaller size than the horizontal stabilizer;

adding an ailevatoron mixer to the particular model of the aircraft; and augmenting a nose-up moment provided by the reduced horizontal stabilizer for the particular model of the aircraft on the takeoff for the particular model of the aircraft via a command from the ailevatoron mixer to respectively, an ailevatoron on each wing of the particular model of the aircraft and thereby, with the reduced horizontal stabilizer replacing the horizontal stabilizer, retaining performance for overcoming the maximum allowed nose-down takeoff weight moment at the takeoff for the particular model of the aircraft comprising the horizontal stabilizer, wherein the ailevatoron mixer augments the nose-up moment by:
 receiving inputs that comprise: a flight control position, rotation speed criteria, aircraft performance, and flight control commands;
 determining, using the inputs, a rotation moment required for rotating a nose of the aircraft off the takeoff surface for takeoff;
 responsive to a moment generated by the horizontal stabilizer being less than the rotation moment, determining a magnitude required for the ailevatoron moment, such that a sum of the moment produced by the horizontal stabilizer and the ailevatoron moment equals the rotation moment;
 determining a deflection, away from the takeoff surface, required for the ailevatoron, respectively on each wing of the wings, to generate a force generating the magnitude required for the ailevatoron moment; and
 commanding a symmetric deflection of each ailevatoron away from the takeoff surface to the deflection determined.

4. The process of claim 3, further comprising reducing a weight for the particular model of the aircraft via the reduced horizontal stabilizer for the particular model of the aircraft.

5. The process of claim 3, further comprising augmenting the nose-up moment via a deflection, away from a takeoff surface, of the ailevatoron on the aircraft.

6. The process of claim 3, further comprising deflecting symmetrically, away from a takeoff surface, each ailevatoron on the aircraft.

7. The process of claim 5, further comprising a force, generated by the deflection of the ailevatoron, being located aft of an axis of contact of main gear of the aircraft on the takeoff surface.

8. The process of claim 3, further comprising deflecting symmetrically, away from a takeoff surface, each ailevatoron on the aircraft based upon a degree of deflection of an elevator on the reduced horizontal stabilizer.

9. The process of claim 3, further comprising deflecting symmetrically, away from a takeoff surface, each ailevatoron on the aircraft based upon a degree of deflection of an elevator on the reduced horizontal stabilizer according to a determination in the ailevatoron mixer.

10. The process of claim 3, further comprising deflecting symmetrically, away from a runway, each ailevatoron on the aircraft based upon a degree of deflection of an elevator on the reduced horizontal stabilizer according to a determination in the ailevatoron mixer considering at least a weight-on-wheels signal and an airspeed of the aircraft.

11. The process of claim 3, further comprising basing the size of the reduced horizontal stabilizer, for the particular model of the aircraft upon a rotation speed based upon an allowable combination of gross takeoff weight and a forward center of gravity that results in a maximum nose-down moment about a point where main gear of the particular model of the aircraft contacts a takeoff surface.

12. The process of claim 3, further comprising reducing the size of the horizontal stabilizer for the particular model of the aircraft by replacing the horizontal stabilizer, after manufacturing the particular model of the aircraft using the horizontal stabilizer, with the reduced horizontal stabilizer, during at least one of: a modification, a reconfiguration, a refurbishment, other maintenance, and other servicing, of the particular model of the aircraft.

13. A process for supplementing a nose-up pitch authority at rotation on takeoff for an aircraft comprising:

increasing a fuel efficiency for a particular aircraft model comprising: a left wing and a right wing, each wing respectively comprising an ailevatoron and extending from opposite sides of a fuselage extending away from the left wing and the right wing and supporting a horizontal stabilizer designed for the particular aircraft model for overcoming a maximum allowed nose-down takeoff weight moment at takeoff;

reducing a drag and a weight of the particular aircraft model via replacing the horizontal stabilizer for the particular aircraft model with a reduced horizontal stabilizer comprising a size smaller than a size of the horizontal stabilizer; and the particular aircraft model comprising the reduced horizontal stabilizer overcoming the maximum allowed nose-down takeoff weight moment at the takeoff designed for the particular aircraft model via an ailevatoron mixer supplementing a nose-up moment from the reduced horizontal stabilizer for the particular aircraft model via commanding a ailevatoron moment from each ailevatoron in a nose-up direction for the particular aircraft model, wherein the ailevatoron mixer supplements the nose-up moment by:
 receiving inputs that comprise: a flight control position, rotation speed criteria, aircraft performance, and flight control commands;
 determining, using the inputs, a rotation moment required for rotating a nose of the aircraft off the takeoff surface for takeoff;
 responsive to a moment generated by the horizontal stabilizer being less than the rotation moment, determining a magnitude required for the ailevatoron moment, such that a sum of the moment produced by the horizontal stabilizer and the ailevatoron moment equals the rotation moment;
 determining a deflection, away from the takeoff surface, required for the ailevatoron, respectively on each wing of the wings, to generate a force generating the magnitude required for the ailevatoron moment; and commanding a symmetric deflection of each ailevatoron away from the takeoff surface to the deflection determined.

14. The process of claim 13, further comprising, based upon a degree of deflection of an elevator on the reduced horizontal stabilizer, deflecting symmetrically each ailevatoron on the particular aircraft model with the reduced horizontal stabilizer.

15. The process of claim 13, further comprising deflecting symmetrically, away from a runway, each ailevatoron on the particular aircraft model based upon a degree of deflection of an elevator on the reduced horizontal stabilizer according to a determination by the ailevatoron mixer considering at least: a weight-on-wheels signal, and an airspeed of the particular aircraft model.

16. The process of claim 13, further comprising basing the size of the reduced horizontal stabilizer, for a maximum nose-down moment for the particular aircraft model, resulting from a particular combination of gross takeoff weight and a maximum allowable forward center of gravity, upon a rotation speed for the particular aircraft model.

17. The process of claim 13, further comprising reducing the size of the horizontal stabilizer for the particular aircraft model by replacing the horizontal stabilizer, after manufacturing the particular aircraft model using the horizontal stabilizer, with the reduced horizontal stabilizer during at least one of: a modification, a reconfiguration, a refurbishment, other maintenance, and other servicing, of the particular aircraft model.

18. The process of claim 13, further comprising augmenting a moment provided by the reduced horizontal stabilizer in the nose-up direction for the particular aircraft model, and reducing a weight of the particular aircraft model via the reduced horizontal stabilizer.

19. The process of claim 18, further comprising augmenting the nose-up moment provided by the reduced horizontal stabilizer via deflecting, away from a takeoff surface, a trailing edge of an ailevatoron on the particular aircraft model.

20. The process of claim 18, further comprising deflecting symmetrically, away from a takeoff surface, each ailevatoron on the particular aircraft model, and augmenting the nose-up moment via generating a force, via each ailevatoron being located aft of an axis of contact of main gear of the particular aircraft model on the takeoff surface.

* * * * *